United States Patent [19]

Bishop et al.

[11] Patent Number: 4,823,256
[45] Date of Patent: Apr. 18, 1989

[54] RECONFIGURABLE DUAL PROCESSOR SYSTEM

[75] Inventors: Thomas P. Bishop, Aurora; Jonas Butvila, LaGrange; David J. Fitch, Naperville; Robert C. Hansen, Wheaton; David A. Schmitt, Glen Ellyn; Grover T. Surratt, West Chicago, all of Ill.

[73] Assignee: American Telephone and Telegraph Company, AT&T Bell Laboratories, Murray Hill, N.J.

[21] Appl. No.: 623,481

[22] Filed: Jun. 22, 1984

[51] Int. Cl.⁴ .............................................. G06F 11/20
[52] U.S. Cl. ................................. 364/200; 364/187; 371/9
[58] Field of Search .................. 371/8, 9, 11, 68; 364/200 MS File, 900 MS File, 187, 134; 179/18 EE, 18 ES; 379/279, 284

[56] References Cited

U.S. PATENT DOCUMENTS

| | | | |
|---|---|---|---|
| 3,303,474 | 2/1967 | Moore et al. | 371/9 |
| 3,557,315 | 1/1971 | Kobus et al. | 179/15 |
| 3,636,331 | 1/1972 | Amrehn | 364/200 |
| 3,810,121 | 5/1974 | Chang et al. | 364/200 |
| 3,812,469 | 5/1974 | Hauck et al. | 340/172.5 |
| 3,820,085 | 6/1974 | Zelinski | 340/172.5 |
| 3,828,321 | 8/1974 | Wilber et al. | 340/172.5 |
| 3,864,670 | 2/1975 | Inoue et al. | 340/172.5 |
| 3,865,999 | 2/1975 | Spitaels | 364/200 |
| 3,889,237 | 6/1975 | Alferness et al. | 340/172.5 |
| 3,959,638 | 5/1976 | Blum et al. | 235/153 AK |
| 3,991,407 | 11/1976 | Jordan, Jr. et al. | 340/172.5 |
| 4,073,005 | 2/1978 | Parkin | 364/200 |
| 4,099,235 | 7/1978 | Hoschler et al. | 364/200 |
| 4,099,241 | 7/1978 | Ossfeldt | 364/200 |
| 4,152,764 | 5/1979 | Connors et al. | 364/200 |
| 4,208,715 | 6/1980 | Kumahara et al. | 364/200 |
| 4,228,503 | 10/1980 | Waite et al. | 364/200 |
| 4,257,009 | 3/1981 | Appelt | 364/200 |
| 4,270,167 | 3/1981 | Koehler et al. | 364/200 |
| 4,282,572 | 8/1981 | Moore, III et al. | 364/200 |
| 4,318,173 | 3/1982 | Freedman et al. | 364/200 |
| 4,358,823 | 11/1982 | McDonald et al. | 364/200 |
| 4,371,754 | 2/1983 | De et al. | 179/18 EE |
| 4,403,286 | 9/1983 | Fry et al. | 364/200 |
| 4,428,044 | 1/1984 | Liron | 364/200 |
| 4,455,601 | 6/1984 | Griscom et al. | 364/200 |
| 4,530,051 | 7/1985 | Johnson et al. | 364/200 |
| 4,590,554 | 5/1986 | Glazer et al. | 364/200 |
| 4,628,508 | 12/1986 | Sager et al. | 371/9 |

FOREIGN PATENT DOCUMENTS 1145477  4/1983  Canada ........................ 354/225.2

OTHER PUBLICATIONS

"Proceeding of the IEEE", vol. 66, No. 10, Oct. 1978, entire issue.

(List continued on next page.)

*Primary Examiner*—Gareth D. Shaw
*Assistant Examiner*—Jonathan C. Fairbanks
*Attorney, Agent, or Firm*—David Volejnicek

[57] ABSTRACT

A is a duel processor system (100) with duplicated memory (114,124) has two modes (10,11) of operation: a converged mode (10) in which one of the two processors (101,102) is active and executing all system tasks while the other processor is inactive; and a diverged mode (11) in which both processors are active and independently executing different tasks. The system automatically changes modes in response to requests such as manual and program control and certain system fault conditions. In diverged mode, the system may be in either of two states of operation (1 and 2). In one state (1) one processor (101) is designated a primary processor, and in the other state (2) the other processor (102) is designated the primary processor. In the converged mode the system may be in either of four states of operation (3-6). In two of these states (3,4) one processor is active while the other processor is standing by ready to take up execution of tasks from the point where the one processor stoped execution. In the other two of these states (5,6) one processor is active while the other processor is out of service and cannot take up task execution without being initialized. The system 100 makes transitions between the various states in response to requests. Except for transitions of an active processor to an out-of-service condition, the state transitions are transparent to tasks other than fault recovery programs and, upon a fault condition, the faulted program.

19 Claims, 12 Drawing Sheets

OTHER PUBLICATIONS

"The Bell System Technical Journal", vol. 62, No. 1, Part 2, Jan. 1983, entire issue.

Fick et al., "System Configurations Determine Degree of Fault Tolerance", Computer Technology Review, vol. 3, No. 1, Jan. 1883, pp. 33–35, 36–37.

S. Ohr, "Fault-Tolerant System Stops Multiple CPUs from Wasting Their Time", *Electronic Design*, (Jul. 21, 1983), pp. 41–42.

DEC Brochure on the VAX 11/782.

Tze-Shiu Liu, "Maintenance Processors for Mainframe Computers", *IEEE Spectrum*, (Feb. 1984), pp. 36–42.

T. F. Storey, "Design of a Microprogram Control for a Processor in an Electronic Switching System", *The Bell System Technical Journal*, vol. 55, No. 2, (Feb. 1976), pp. 183–232.

L. E. Gallaher et al., "The Fault-Tolerant 3B20 Processor", *AFIPS Conference Proceedings*, 1981 National Computer Conference, (5/4–7/81, Chicago, IL), pp. 41–48.

E. I. Orlov "Joint Operation of Two Electronic Computers Solving a Common Problem", *Soviet Journal of Instrumentation and Control*, No. 2, (Feb. 1968), pp. 38–39.

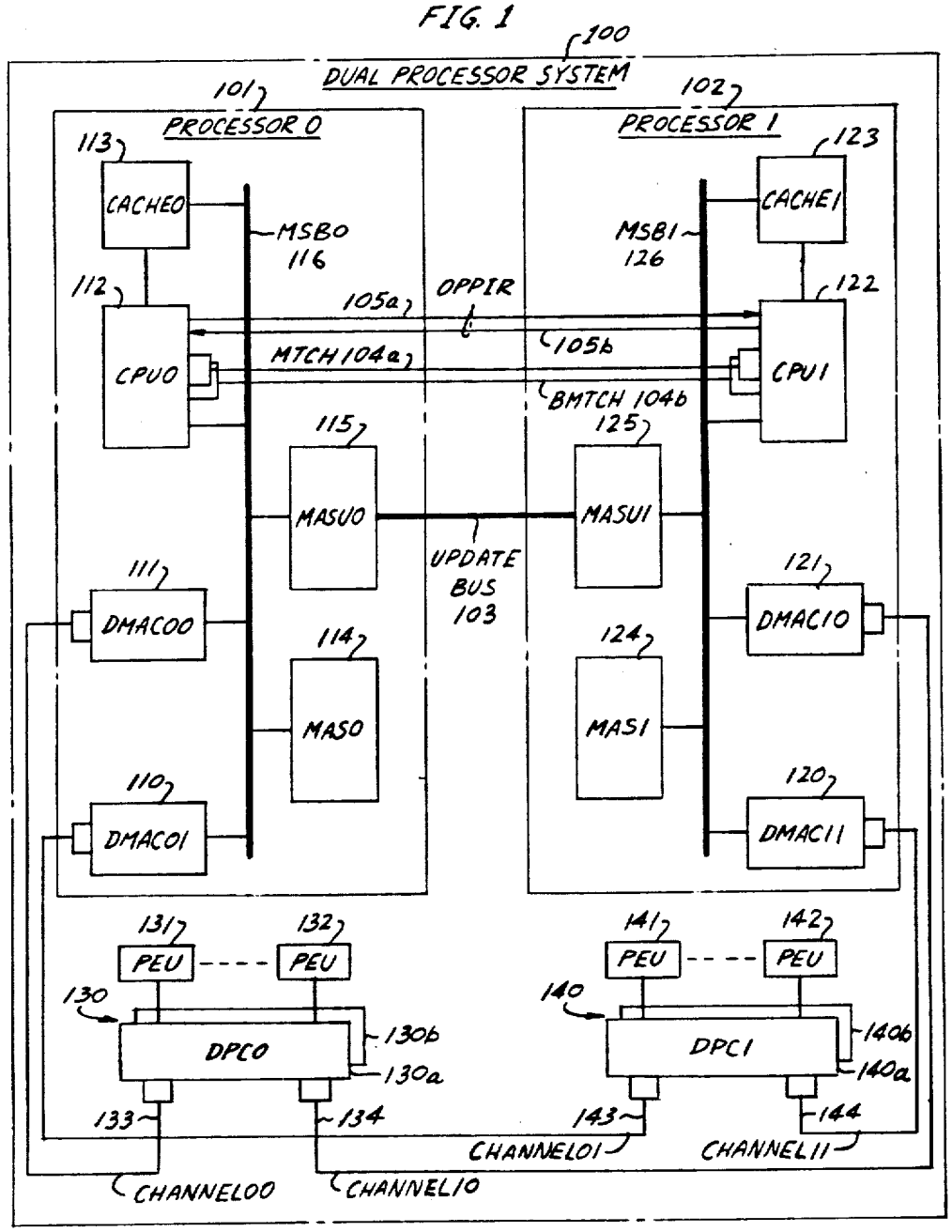

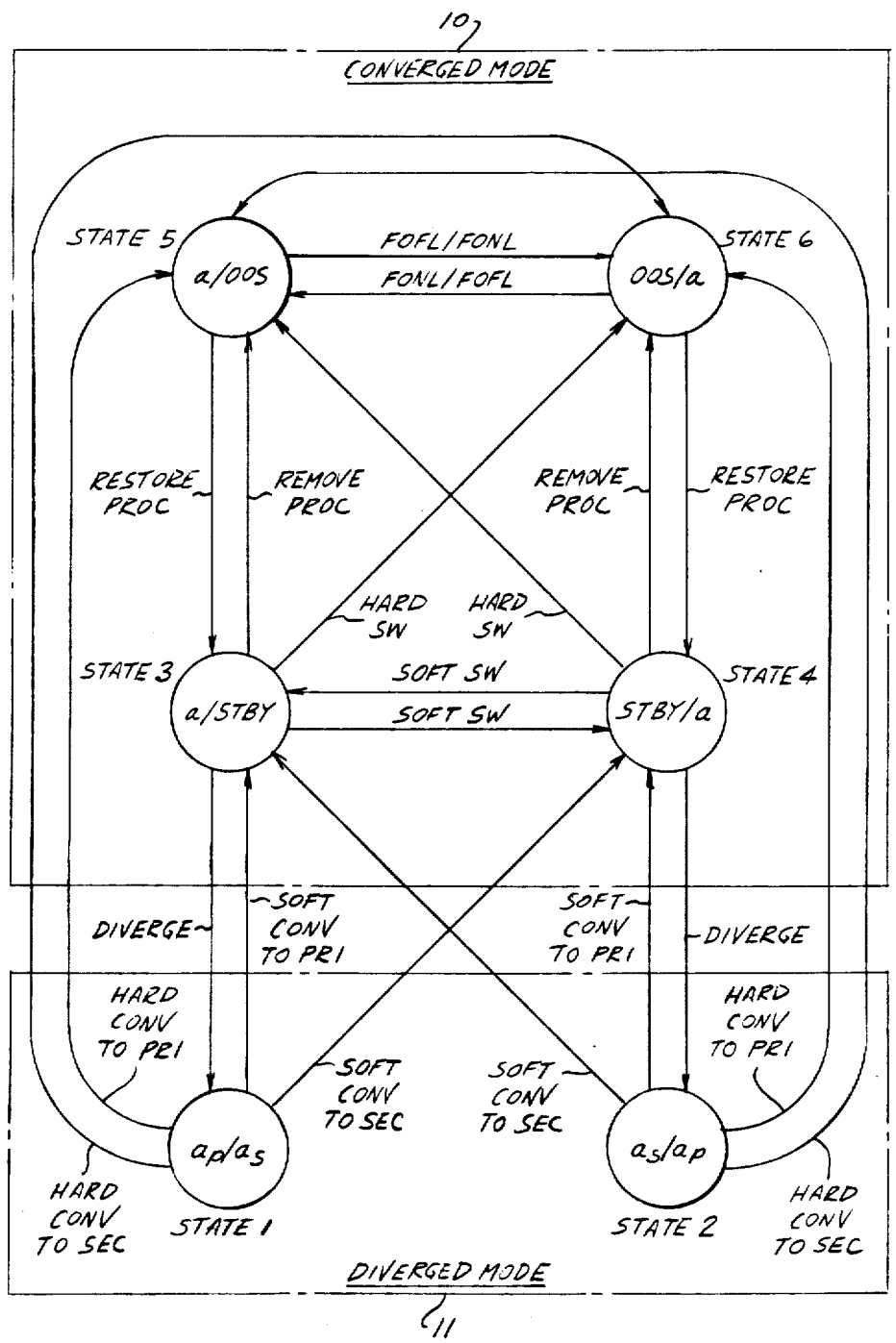

FIG. 4

| | 209 | 210 | 211 | 212 | 213 | 214 | 215 | 216 | 217 | 218 | 219 | 220 |
|---|---|---|---|---|---|---|---|---|---|---|---|---|
| -- | UPDATE ENABLE | PRIM/ SEC | ISC0 | ISC1 | INIT. COMP. | FOFL | FONL | I/O ENAB. | MAN. | OOS | STBY | ACTIVE |

SYSTEM STATUS INDICATORS 200

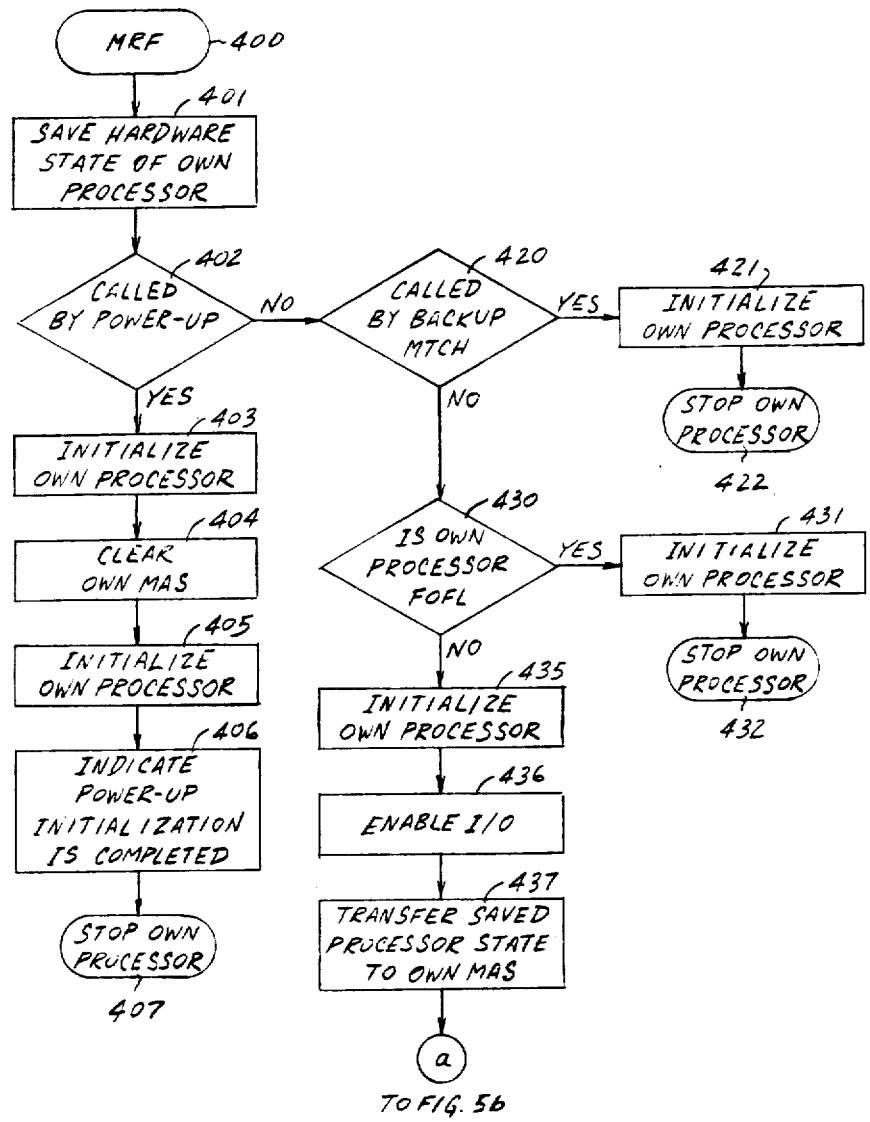

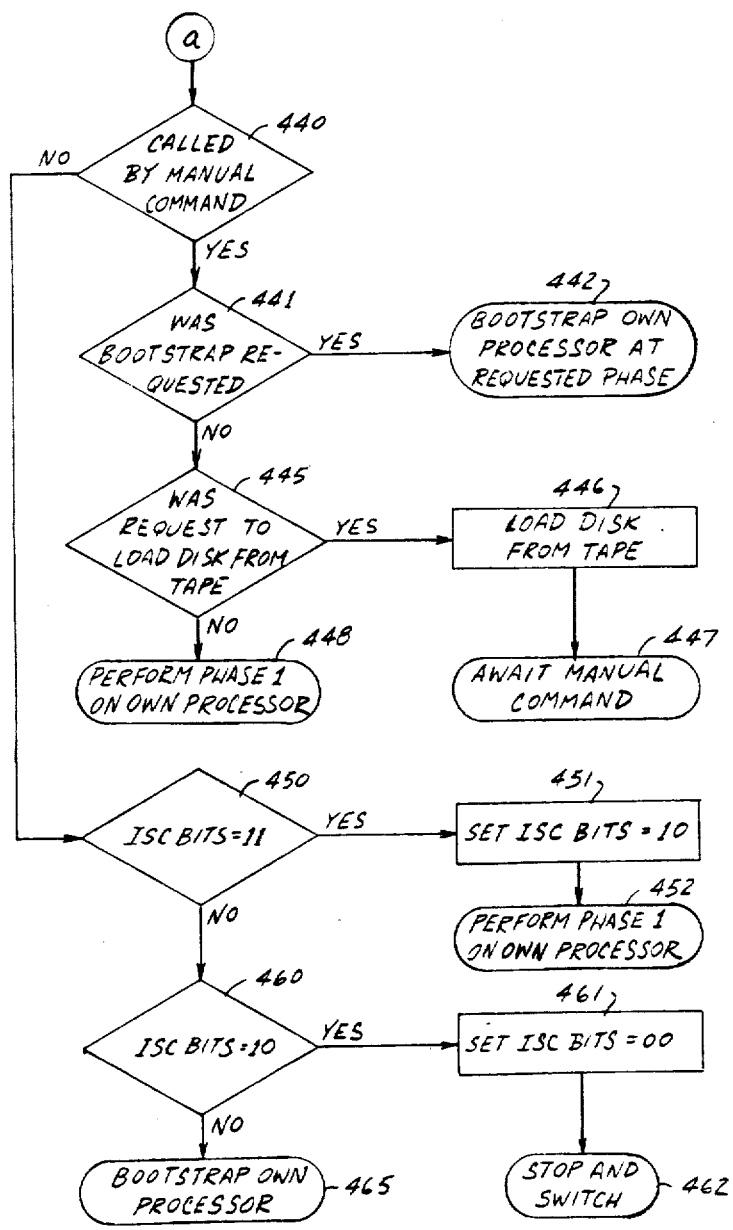

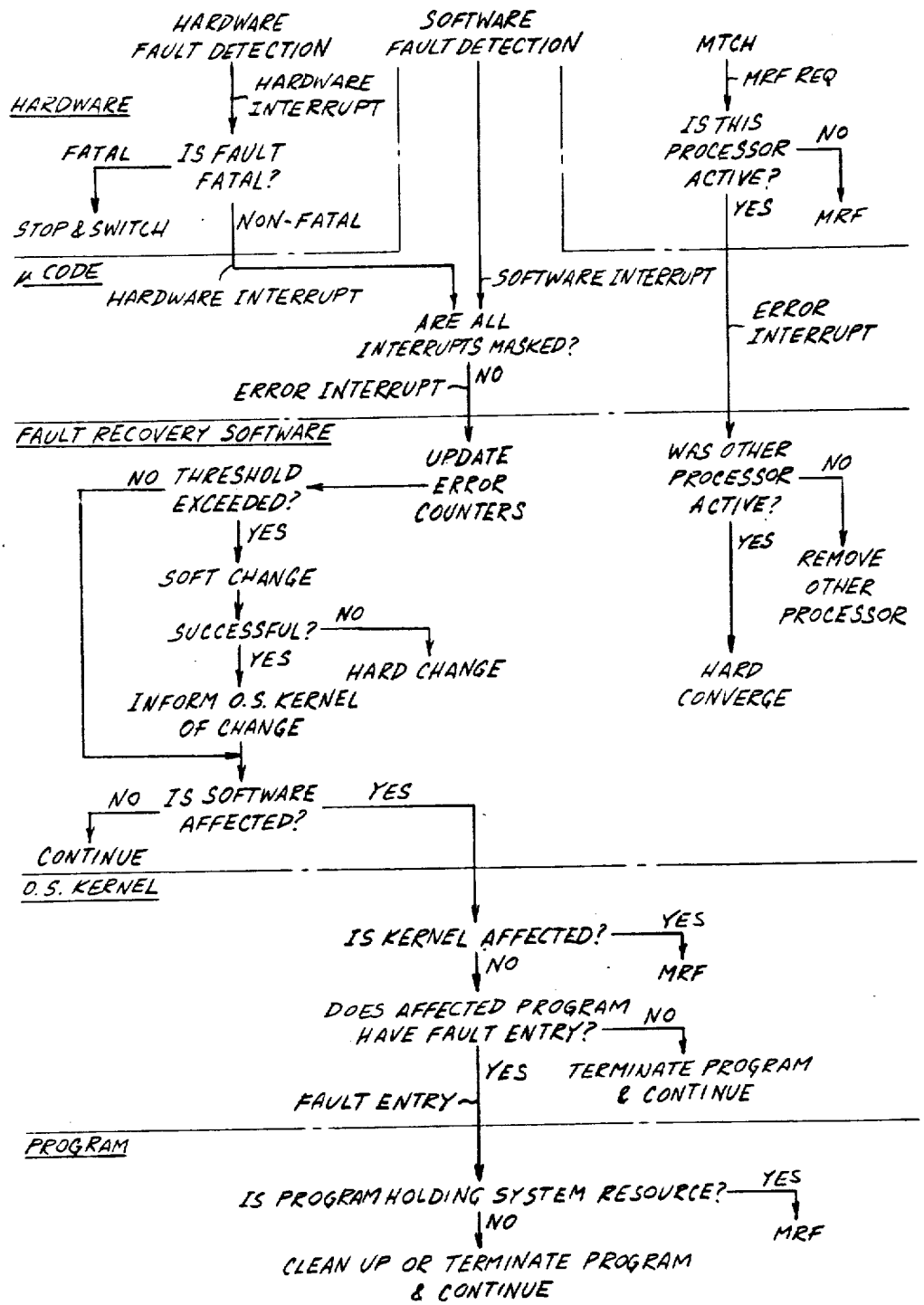

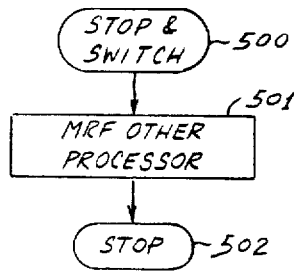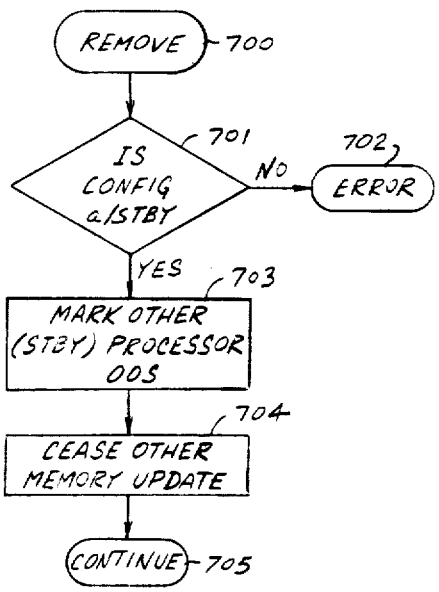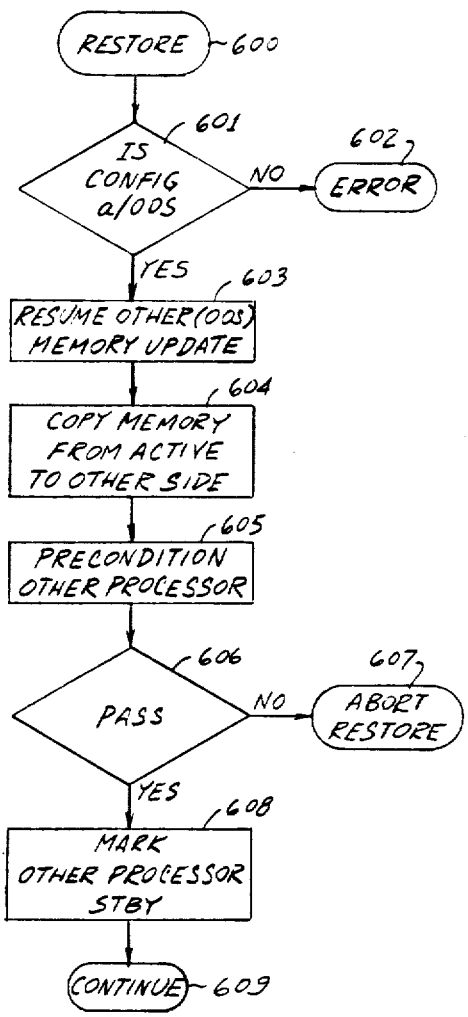

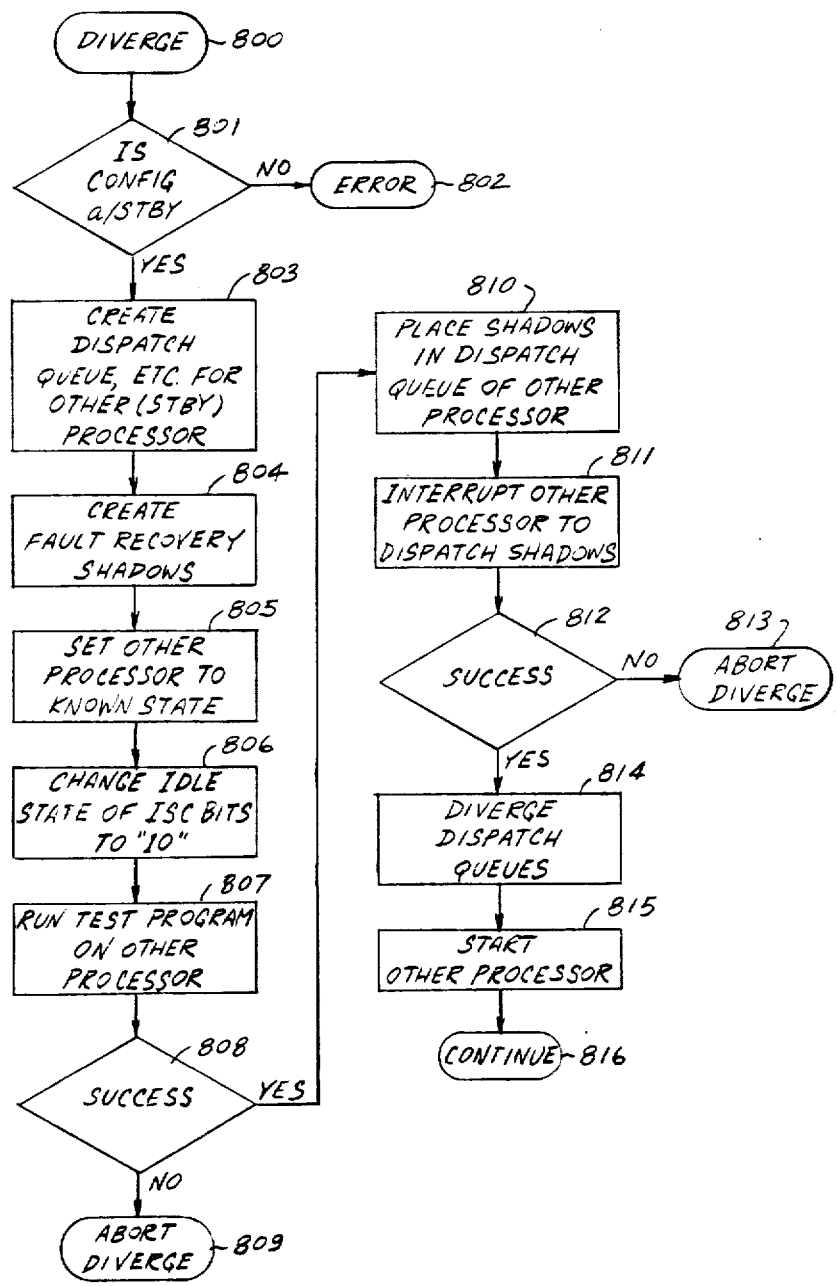

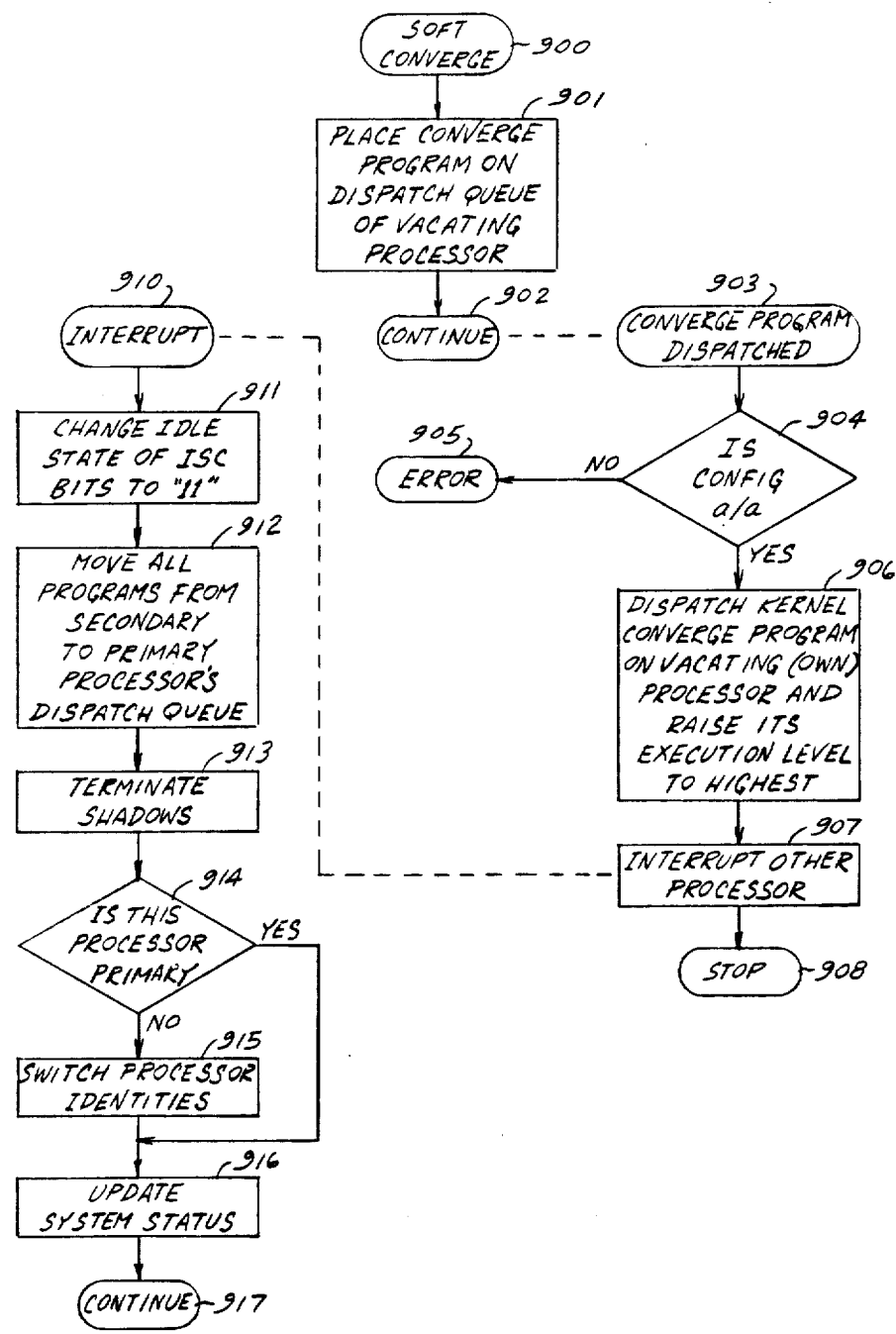

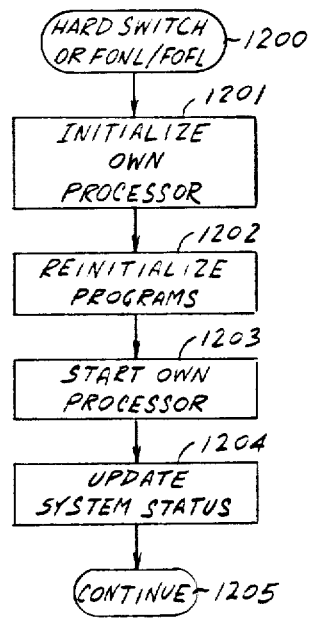

RECONFIGURABLE DUAL PROCESSOR SYSTEM

TECHNICAL FIELD

This invention relates to the field of information processing systems in general and to fault-tolerant processor systems in particular.

BACKGROUND OF THE INVENTION

Conventional processing systems generally have been configured around a single central processor. The central processor has been the main computing unit of the processing system. The central processor has also generally been the main administrator of the system, charged with coordinating the operation of various system units to perform system tasks. Like the central processor, the other system units have largely not been duplicated in the system.

Such systems have not been highly reliable, in the sense of being prone to partial or total operational failure as a result of a component unit becoming faulty. In particular, a major fault in the central processor has generally brought down the whole processing system, and the system has been unavailable for performing assigned tasks until the fault was repaired.

Ever-increasing demands being placed on the processing capabilities of systems have often exceeded the computing capacity of a single central processor. A solution to this problem has been to attach one or more auxiliary processors to the central processor in such systems. The function of the auxiliary processor has been to take some of the computational load off the central processor, and thus increase the overall system processing capability. Commonly, however, the attached processor has operated merely as a special purpose computing unit under the control of the central processor. It has commonly shared other system resources with the central processor and often was adapted to communicate with those resources only via the central processor. The central processor has retained administrative control over the processing system.

The processing power of a system has been significantly increased by the attachment of an additional processor. However, since most system units have remained unduplicated and the central processor has retained its key position in such processing systems, system reliability has not been improved. In particular, the susceptibility of the system to faults in the central processor has remained substantially unchanged from the single processor configuration.

On the other hand, certain applications of processing systems, such as communication switching systems, cannot easily tolerate being put out of service by the failure of system units. Such applications require the use of highly reliable processing systems. Reliability in such systems has been achieved by the duplication of system units, in particular, the central processor. Generally, the duplicated central processors in such systems operate either in a lock-step configuration, with each processor performing all system tasks in parallel with the other processor, or in an active-standby configuration wherein one processor is performing all system tasks while the second processor is acting as a backup and is standing idle by, ready to take over should the one processor fail, or in a checkpoint configuration wherein a processor sends information about transactions that it undertakes to another processor so that if failure of the one processor were to occur, the other processor could compute the current state of the failed processor and take over its transactions from that point.

In such systems either one of the duplicated processors is adapted to handle all systems tasks alone. Thus a fault in one of the processors does not bring about the failure of the processing system. The other processor carries on all system tasks, but without a backup, until the faulty processor is repaired. In such systems it takes the simultaneous failure of both processors to incapacitate the system. System reliability is thus significantly improved over the single processor configuration. However, even though such highly reliable systems have undergone the expense of duplicating system units, including the central processor, they can effectively utilize the processing power of only one of the processors at any one time. Their processing capacity therefore is no better than that of a corresponding system having only one processor.

Multi-processor systems have also become known to the art. Such systems include a plurality of processing units, often operating independently of each other. The processing units are commonly attached to a communication bus the use of which they share and over which they communicate both with each other and with shared resources such as memory. It has been difficult to make such systems highly reliable, one reason being that all of the processing units share, and hence all depend upon the proper functioning of, the shared resources such as memory. And because a plurality of the processing units share the resource, there is an increased chance that one of the processing units will malfunction and adversely affect the shared resource, thereby adversely affecting the operation as well of the other processing units that depend upon that resource.

SUMMARY OF THE INVENTION

It is these and other disadvantages of the prior art that the present invention is directed to solving. According to the invention, a dual-processor duplicated-memory system selectively operates in a first mode wherein both processors are active and each is executing system tasks substantially independently of the other, and a second mode wherein one processor is inactive and the other processor is active and executing system tasks. With exceptions, transitions between the modes are made transparently to execution of application tasks.

The system includes two processors. Each processor has its own main memory, and the two main memories have the same contents. The two main memories are interconnected by an arrangement for automatically updating each memory with content changes being made in the other main memory, to cause the two main memories to continue duplicating each other's contents. Significantly, the system includes an arrangement for automatically changing system operation from one to the other mode transparently to execution of application tasks, in response to certain conditions. These conditions are, for example, manual and program commands and certain system fault conditions such as "soft" faults. In the first mode, both processors are active and each as executing, substantially independently of the other, tasks selected from a different one of a first and a second group of tasks. In the second mode, a selected either one of the processors is inactive, while the other processor is active and executing tasks selected from both the first and second groups of tasks.

Furthermore, the system preferably includes two sets of peripherals, with each set having a controller that selectively couples it to either one of the processors.

Preferably, in the second mode the inactive processor is a stand-by processor, ready to assume execution of tasks. The arrangement for changing system operation preferably includes an arrangement for selectively starting and stopping a selected processor, an arrangement for assigning both groups of tasks for execution to the remaining active processor when one of the processors is stopped, and an arrangement for assigning each group of tasks to a different processor when both processors are active. The assignments are preferably accomplished via dispatching queues that are stored in both main memories.

The inventive system is both powerful in terms of processing capability and highly reliable. It possesses the computing power of a system having a central processor with an attached auxiliary processor. Yet it has the reliability, in terms of being available despite processor failure, of a duplicated processor system. And because the processors each have their own main memory, the system avoids the reliability problems of systems in which processors share memory. The inventive system is versatile in that it can be selectively operated either in a mode where both processors are active and independently performing system tasks or in a mode where one processor is active while the other processor is in standby. Furthermore, each processor has access to all system resources, including to all peripheral units, and therefore either processor can perform all tasks equally well. The system can be reconfigured from one mode of operation to another at will. The system reconfigures itself automatically into the appropriate mode in response to manual commands or to system conditions such as the occurrence of faults. And, with the exception of system reconfiguration following fatal faults such as drastic hardware failures, most system reconfigurations are transparent, except for performance considerations, to application programs being executed on the system. The application programs are oblivious both to the mode in which the system is operating and to changes in system configuration, with the stated exceptions.

These and other advantages and features of the present invention will become apparent from the following description of an illustrative embodiment of the invention, taken together with the drawing.

BRIEF DESCRIPTION OF THE DRAWING

FIG. 1 is a block diagram of an illustrative processing system embodying the invention;

FIG. 2 is a state diagram of the operational modes and states, and transitions therebetween, of the system of FIG. 1;

FIG. 4 is a block diagram of system status indicators of a processor of FIG. 1;

FIGS. 5a-b are a logical function diagram of the maintenance reset function (MRF) of the system of FIG. 1;

FIG. 6 is a logical flow diagram of recovery actions undertaken by an active processor of FIG. 1;

FIG. 7 is a logical function diagram of the stop and switch process of FIG. 6;

FIG. 8 is a logical function diagram of the restore process of FIG. 2;

FIG. 9 is a logical function diagram of the remove process of FIG. 2;

FIG. 10 is a logical function diagram of the diverge process of FIG. 2;

FIG. 11 is a logical function diagram of the soft converge processes of FIG. 2;

FIG. 14 is a logical function diagram of the hard switch and FONL/FOFL processes of FIG. 2.

DETAILED DESCRIPTION

Figure 3A:
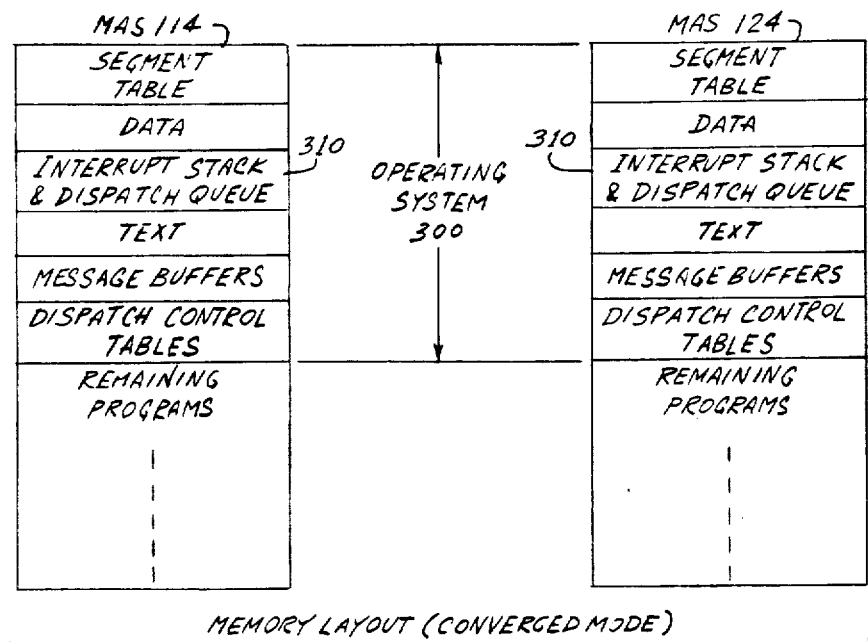
FIGS. 3a and 3b are block diagrams of the memory layouts of the operating system portions of the memories of the system 100 of FIG. 1 when in the converged and diverged modes of FIG. 2, respectively.

An illustrative embodiment of the invention is shown in block diagram form in FIG. 1. Shown there is a dual processor system 100, which is suitably the AT&T 3B20D/UNIX TM RTR computer system made by AT&T Technologies, Inc. The system comprises the UNIX RTR operating system executing on the 3B20D computer. The 3B20D/UNIX RTR computer system is described in *The Bell System Technical Journal*, Vol. 62, No. 1, Part 2, of January, 1983. The Journal may be referred to for an understanding of the construction and operation of the 3B20D/UNIX RTR computer system, but a brief description thereof will be given herein to illustrate how the invention functions therein.

The dual processor system 100 comprises a pair of processors 101 and 102. The processors 101 and 102 are substantially identical. In a conventional mode of operation, one of the processors 101 and 102 is active, operating under the control of the operating system to execute application tasks, also referred to as programs or processes, assigned for execution thereto. The other of the processors 101 and 102 is conventionally idle, standing by and ready to become the active should a fault place the active one of the processors 101 and 102 out of service.

The main task execution, control, and data manipulation functions of the processor 101 are performed by a central processing unit (CPU) 112. The CPU 112 is a microprogrammed machine: most processor functions are carried out by execution of micro-instructions, stored in a microprogram store (not shown) internal to the CPU 112. Execution of sequences of micro-instructions implements operations dictated by program instructions. The CPU 112 generally obtains data and program instructions from the main on-line memory facility of the processor 101, referred to as the main store (MAS) 114. Both application programs and the operating system software may be found stored in the main store 114. For improved speed of operation, the CPU 112 may optionally be equipped with a write-invalidate cache 113 which serves as a high speed buffer for information transfers between the CPU 112 and the main store 114.

Communications between the main store 114 and devices such as the CPU 112 and the cache 113 proceed over a main store bus (MSB) 116 and are controlled by a main store update unit (MASU) 115 which arbitrates access to the main store 114. A pair of direct memory access controllers (DMAC) 110 and 111 also connect to the main store bus 116 to provide the facility of direct information transfers between the main store 114 and the periphery of the processor 101.

As the processors 101 and 102 are substantially duplicates of each other, the processor 102 similarly comprises a pair of DMACs 120 and 121, a CPU 122, a cache 123, a MAS 124, and a MASU 125 interconnected by a MSB 126.

The periphery of the processors 101 and 102 comprises a plurality of peripheral equipment units (PEU) 131-132 and 141-142. These units may comprise secondary storage facilities such as disk memory and tape memory systems, input and output communication equipment such as CRT displays, keyboard terminals, and teleprinters, as well as a host of other equipment, as required by the application to which the dual processor system 100 is put. A first group of peripheral equipment units 131-132 is connected to a dual port controller (DPC) 130. One communication port of the dual port controller 130 is connected to a communication channel 133 while the other port of the controller 130 is connected to a channel 134. The controller 130 selectively interfaces the peripheral equipment units 131-132 to one or the other of the channels 133-134, as dictated by directives received over the channels 133-134. The channel 133 connects to the DMA controller 111 and the channel 134 connects to the DMA controller 121, thus giving both processors 101 and 102 access to the peripheral equipment units 131-132.

For purposes of reliability, the dual port controller 130 may be duplicated to comprise a pair of controllers 130a-b. Selection and activation of one of the pairs of controllers 130a-b may be accomplished via commands sent over one of the channels 133-134.

In a similar manner, a second group of peripheral equipment units 141-142 is interfaced selectively to one of a pair of channels 143 and 144 by a dual port controller 140. The channel 143 connects to the DMAC 110 while the channel 144 connects to the DMAC 120, to give both processors 101 and 102 access to the peripheral equipment units 141-142 as well. The controller 140 may also be duplicated, and selection of one of the pair of controllers 140a-b may be made via the channels 143 and 144.

To allow either one of the processors 101 and 102 to perform systems tasks equally well and to substitute for each other should one of them fail, the contents of their main stores 114 and 124 must be kept identical. For this purpose the main store update units 115 and 125 of the processors 101 and 102 are interconnected by a communication bus referred to as an update bus 103.

Aside from arbitrating access to the main store 114, the main store update unit 115 monitors the type of access being made to the main store 114. If the requested access is of the type tending to change the contents of the main store 114, for example, a write or a clear operation, the main store update unit 115 issues a request to the main store update unit 125 for access to the main store bus 126, as any other unit connected to the bus 126 might. The main store update unit 125 processes the request as any other request for access to the bus 126, but gives it the highest priority. When the bus 126 becomes available, the main store update unit 125 signals a grant of access to the main store update unit 115 and connects its end of the update bus 103 to the main store bus 126. In response to the grant signal, the main store update unit 115 connects its end of the update bus 103 to the main store bus 116 and allows the initially-requested access to the main store 114 to proceed. Because the buses 116 and 126 are now connected, main store access is made over both buses 116 and 126 to both main store units 114 and 124, and the contents of the units 114 and 124 are changed in the same way. Following completion of the access, both main store update units 115 and 125 disconnect the update bus 103 from their respective main store buses 116 and 126. This function of the MASUs 115 and 125 of updating the other processor's MAS 124 or 114, respectively, may be disabled by a command to the MASUs 115 and 125.

With respect to main store write or clear accesses originating with the processor 102, which accesses need to be made to both main stores 114 and 124, the above-described roles of the main store update units 115 and 125 are merely reversed.

Further, a direct communication channel is provided between the CPU 112 and the CPU 122. Referred to as a maintenance channel (MTCH) 104a, it provides a control and communication bus for the purpose of diagnosing the inactive one of the processors 101 and 102 from the on-line, active, processor. The maintenance channel 104a also provides low level maintenance control for fault recovery programs, so that a switch in processor activity can be carried out with no operational interference. In addition, other maintenance controls can be exerted by one of the processors 101 and 102 over the maintenance channel 104a to start an initialization sequence on the other processor or to stop program execution on the other processor. The maintenance channel 104a can also receive micro-instructions from an external source and execute them. The maintenance channel 104a can also control processor buses and issue processor control signals. Hence, the maintenance channel 104a can exercise almost complete control over a processor and can provide enough access to diagnose the processor.

For reliability purposes, the maintenance channel 104a is backed up by a backup maintenance channel 104b. The backup maintenance channel 104b merely allows a processor to reset the sanity timers (not shown) of the other processor. Sanity timers are hardware-implemented timers that run on the processors when the processors are powered up. Sanity timers time out at some value and at that point cause reinitialization of the processor to occur. Hence sanity timers must be reset periodically to prevent reinitialization from occurring.

Lastly, a pair of other-processor programmed interrupt request (OPPIR) signal lines 105a and 105b extend between the CPU 112 and the CPU 122. As their name implies, these signal lines allow the CPU 112 and 122 to issue programmed, i.e., software-initiated, interrupt requests to each other.

Aided by the above-described hardware configuration of the dual processor system 100, the operating system of the dual processor system 100 allows the system 100 to selectively operate in one of a plurality of configurations, as indicated in FIG. 2, and to become reconfigured in response either to commands given to the system 100 by its operators or to internally sensed conditions such as the occurrence of faults.

The conventional mode of operation of the dual processor system 100, illustratively comprising the 3B20D computer and the UNIX RTR operating system, has been a converged mode, designated in the system 100 configurational state diagram of FIG. 2 by the number 10. In the converged mode 10, only one of the processors 101 and 102 is active and is executing all system tasks while the other processor is inactive. During normal system operation, the inactive processor is standing by, ready to take over as the active processor if called upon to do so. Generally following the occurrence of a failure in the active processor, the failing processor becomes the inactive processor and is taken out of service such that it is no longer considered ready to take over as the active processor. After such a failure, the previously-inactive processor becomes active and, besides taking over system tasks, diagnoses the failed processor in an effort to return it to an active or a standby state.

As shown in the memory layout map of FIG. 3a, in the converged mode 10 of operation, only one version of the operating system, designated by the number 300, exists in the system 100, albeit duplicate copies of it are stored in the main stores 114 and 124. That version 300 of the operating system executes on whichever one of the two processors 101 and 102 happens to be active.

Returning to FIG. 2, within the converged mode 10 of operation, the system 100 may be in any one of four operational states 3-6. Each of these states is shown bearing a label that first indicates the status of processor0, designated by the numerals 101 in FIG. 1, followed by a slash, followed by an indication of the status of processor1, designated by the numerals 102 in FIG. 1. As FIG. 2 shows, in state 3 the processor0 101 is active (a) and the processor1 102 is standing by (STBY); in state 4 the operational states of the processors 101 and 102 are reversed. In state 5 the processor0 101 is active and the processor1 102 is out of service (OOS); in state 6 the operational states of the two processors 101 and 102 are reversed.

The system 100 embodying the invention additionally has a diverged mode of operation, designated in FIG. 2 by the number 11, in which both processors 101 and 102 are active and executing different system tasks. Different tasks may involve execution of copies of the same program. Within the diverged mode of operation, the system 100 may be in either of two operational states. In state 1, the processor0 101 is designated as a primary processor ($a_p$), and the processor 102 is designated as a secondary processor ($a_s$); in state 2 the primary and secondary designations of the processors 101 and 102 are reversed. In an active-inactive system configuration such as those of the converged mode 10, the active processor is always considered to be the primary processor. Hence, as FIG. 2 suggests, in states 1, 3 and 5 the processor0 101 is the primary processor and the processor1 102 is the secondary processor, while in states 2, 4, and 6 the primary and secondary designations of the processors 101 and 102 are reversed.

The primary and secondary designation of a processor is made, for example, by setting a flag 210 shown in FIG. 4 in each processor 101 and 102 to the proper state. The flag 210 is one of a plurality of system status indicators 200 that are associated with each processor 101 and 102. The flag 210 may be a flag bit of a system configuration-indicating register. Or the flag 210 may be a word of memory. In the 3B20 computer, the flag 210 is implemented as follows: a word of main store memory identifies either processor 0 or processor 1 as the primary processor. This word is used by a processor in cooperation with a flag bit in its own configuration-indicating system status register (SSR) that identifies the processor as being processor 0 or processor 1 to determine whether the processor is primary or secondary.

Figure 3B:
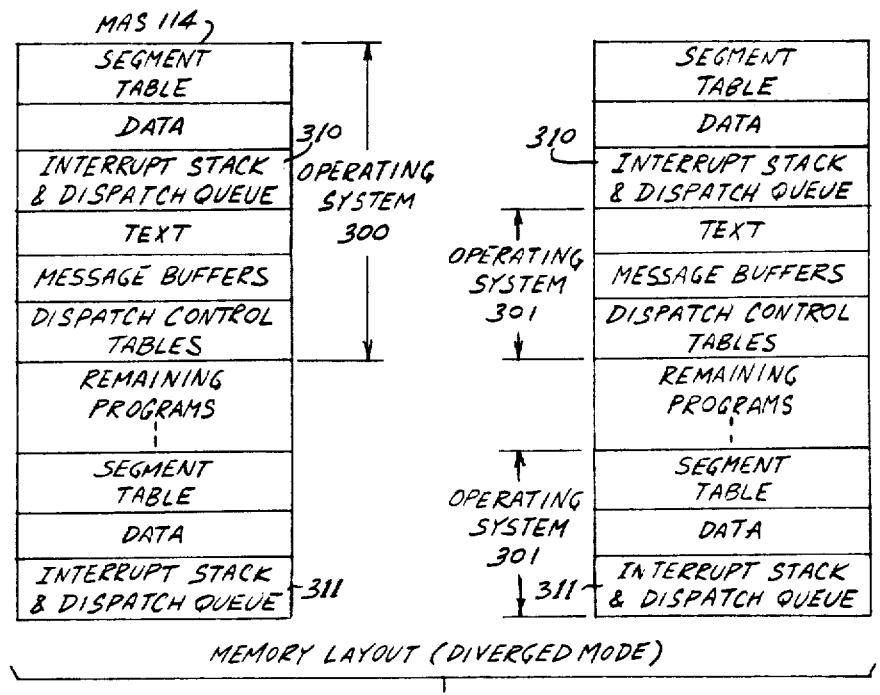

As shown in the memory layout map of FIG. 3b, in the diverged mode 11 of operation, two versions of the operating system, designated by the numbers 300 and 301, exist in the system 100. A primary version 300 of the operating system executes on the primary one of the processors 101 and 102 and a secondary version 301 executes on the secondary processor. Because the main store units 114 and 124 are kept updated, i.e., their contents are kept identical, a copy of both versions 300 and 301 of the operating system is stored in each main store 114 and 124.

In the diverged mode 11, the two processors 101 and 102 are operating independently of each other, in the manner of individual processors, and therefore each processor 101 and 102 is executing a different one of the versions 300 and 301 of the operating system. Nevertheless, the versions 300 and 301 are versions of the same operating system. Furthermore, even though the processors 101 and 102 are performing independent tasks, that each obtains from its own dispatch queue, the two dispatch queues are fed from a common work list. Therefore the portions of the operating system that are common to both versions 300 and 301 thereof, for example the operating system text, message buffers, and dispatch control tables, are shared by the two versions 300 and 301. Each version 300 and 301 of the operating system only maintains separately those portions of the operating system that are dependent upon the primary or secondary designation of the processor 101 or 102 on which it is executing and upon the particular task that it is performing. These dependent portions are, for example, the interrupt stack and dispatch queue, data, and segment table.

In response to operating conditions, such as the occurrence of faults, or in response to commands from system users, the system 100 may make transitions between the various operational states. How these transitions, graphically suggested by arrows in FIG. 2, are undertaken is the subject of much of the remaining discussion.

Changes of state of operation of the system 100 generally fall into two categories: hard changes and soft changes. Hard changes are those which entail some degree of system 100 initialization such that they cannot be made transparent to application programs. System initialization is a sequence of actions that must be taken to recover normal processing capability after encountering a fault. Hard changes generally result from the occurrence of faults in an active processor that are of such magnitude that the affected processor is unable to continue operation and must be taken out of service. These are referred to as fatal faults. Hard changes may likewise result from an escalation of recovery attempts from non-fatal faults, ones that need not cause hard changes, but wherein attempts at recovery through soft changes have failed. Faults leading to a hard change are referred to as faults of a first type. Hard changes may also be made in response to manual, i.e. operator, requests or to program requests.

Figure 13:
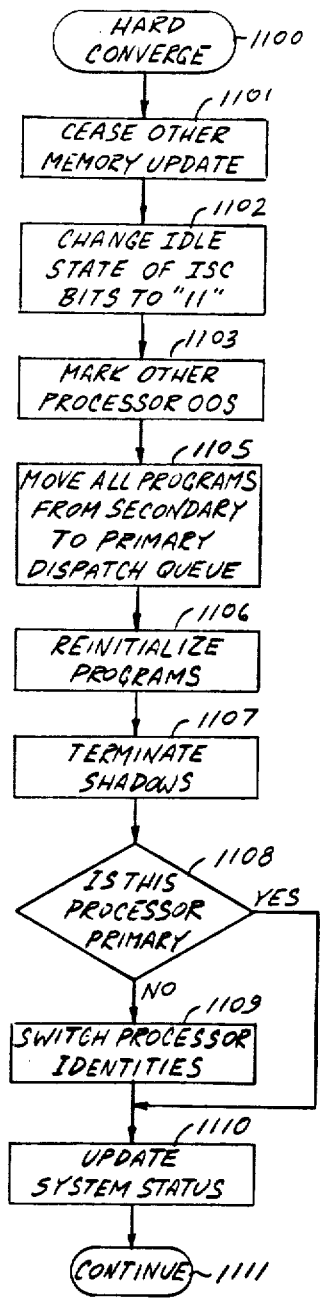
FIG. 13 is a logical function diagram of the hard converge processes of FIG. 2.

Referring to FIG. 2, hard changes are transitions from the state 3 to the state 6, or from the state 4 to the state 5, referred to as "hard switch". The process of hard switching is discussed in conjunction with FIG. 14. A change between the states 5 and 6, referred to as "force online/force offline", is likewise a hard change, and is also discussed in conjunction with FIG. 14. Hard changes are also transitions from the state 1 to the state 5 and from the state 2 to the state 6, referred to as "hard converge to primary", and transitions from the state 1 to the state 6 or from the state 2 to the state 5, referred to as "hard converge to secondary". The process of hard converging is discussed in conjunction with FIG. 13.

Figure 12:
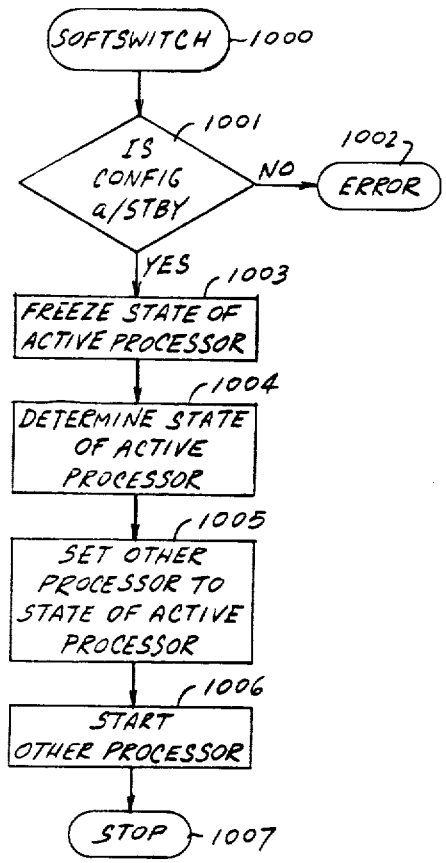
FIG. 12 is a logical function diagram of the soft switch processes of FIG. 2.

Soft changes are those which do not entail system reinitialization, or entail initialization of such a nature that they oan be made transparent to most application programs executing on the system 100. They generally result from the occurrence of non-fatal hardware faults or from the occurrence of software faults. Faults leading to a soft change are referred to as faults of a second type. Soft changes may also be made in response to manual requests or to program requests. Soft state changes include the change from the state 1 to the state 3 or from the state 2 to the state 4, referred to as "soft converge to primary", and the changes from the state 1 to the state 4 or from the state 2 to the state 3, referred to as "soft converge to secondary". The process of soft converge is discussed in conjunction with FIG. 11. Changes between the states 3 and 4, referred to as "soft switch" are also soft changes. The process of soft switching is discussed in conjunction with FIG. 12. Soft state changes also include the change from the state 3 to the state 1 or from the state 4 to the state 2, referred to as "diverge". The process of diverging is discussed in conjunction with FIG. 10. A change from the state 5 to the state 3 or from the state 6 to the state 4 is also a soft state change and is referred to as "restore processor". The process of processor restoration is discussed in conjunction with FIG. 8. And a soft change from the state 3 to the state 5 or from the state 4 to the state 6, is referred to as "remove processor". Processor removal may also occur in response to hardware faults in an inactive processor that would cause a hard change in an active processor. Such hardware faults do not cause a hard change in an inactive processor because no software that could be affected by the fault is executing on the standby processor. The process of processor removal is discussed in conjunction with FIG. 9.

For automatic reconfiguration in response to the detection of a fault, the system 100 depends upon fault detection and recovery hardware and software. The fault detection and recovery mechanisms of the system 100 are described in the abovementioned issue of the Bell System Technical Journal, which may be referred to for a more comprehensive understanding thereof. But a brief description of these mechanisms will be given herein to illustrate how the invention functions within the system 100.

Fault detection circuitry and programs included in the system 100 are extensive. Fault detection hardware and software techniques include extensive use of local matching circuits, parity techniques on all buses, Hamming error correction on the main stores, cyclic redundancy codes on secondary and tertiary memories, and numerous hardware and software sanity timers throughout the control units and peripherals. In addition, routine diagnostics are used to detect failures in the fault detection mechanisms themselves. Routine sanity checks are used to ensure that peripheral subsystems are healthy. Finally, system integrity checks catch problems that may not be caught by unique detectors.

When any of the fault detectors determine an error condition, an interrupt is registered in the affected processor 101 or 102. Interrupts caused by the most severe of the faults result in automatic hardware sequences, hard changes, that switch the activities to the unaffected processor. Less severe faults result in interrupts to the microcode and software charged with recovery of the system.

Fault recovery programs control fault detection and recovery for hardware and software. The hardware fault recovery programs receive hardware interrupts and control the recovery sequences that follow. Upon determining that a particular error is exceeding predetermined frequency thresholds, changes in the configuration of the system to a healthy state are made.

Software fault recovery programs are very similar in architecture to hardware fault recovery. Each major unit of software has associated with it fault detection mechanisms such as defensive checks and audits, error thresholds, and error recovery mechanisms such as failure returns, data-correcting audits, and reinitialization techniques. In addition, proper execution of programs is monitored to ensure that a program does not put itself into an infinite execution loop, does not excessively consume system resources such as message buffers, does not try to access memory outside of defined limits, and does not try to execute instructions that are not permitted to the program. Each program or set of programs has reinitialization and recovery controls so that a recovery can be effected. On the 3B20D computer, this is usually accomplished by providing each program with a separate entry point called a fault entry point.

If recovery actions result in removal of hardware or software units from the system 100, diagnostic and audit programs are dispatched automatically to analyze the hardware and software problems that led to the removal.

Bootstrap and other initialization programs provide a fundamental set of microcode and software-implemented actions for controlling processor initialization and thereby achieving recovery of normal processing capabilities. System initialization involves execution of a microcoded sequence of actions that are taken to recover normal processing after encountering a condition such as a fault. System initializations are initiated automatically by hardware or software recovery mechanisms or by manual requests.

System initialization or reinitialization is required in the following situations: when the system is first brought into service, i.e., powered up; after each hardware fault requiring a processor switch, hard or soft; when a sanity timer times out; after excessive hardware and software interrupts, as indicated by counters; in response to program requests; and in response to manual requests.

The initialization sequence, regardless of its source, has a common beginning in a hardware signal within a processor, referred to as a Maintenance Reset signal. The Maintenance Reset signal causes an interrupt in the processor to which it is issued. The interrupt that results from the Maintenance Reset signal represents the highest priority microcode interrupt in the system 100. The initialization sequence that is executed upon receipt of the Maintenance Reset signal leads to initialization of the processor in which it is called. This initialization sequence is referred to as a Maintenance Reset Function (MRF). MRF is discussed in more detail further below in conjunction with FIGS. 5a–b.

The system 100 follows a progressive initialization strategy to achieve recovery. The initialization action taken is matched to the severity of the fault to prevent unnecessary loss of processing ability. If a particular level of initialization is not successful in achieving recovery, then the level of initialization is escalated, if it is not already at the maximum level, until recovery is achieved.

There are four phases of progressive software initialization that an active processor in the system may undergo.

In phase one (∅1) of software recovery, processor hardware is reset to a known state, programs are reinitialized, and the processor's operating system kernel is entered at a known entry point. This is a fast recovery, and there is no bootstrap, i.e., no reloading of the main stores from secondary memory.

In phase two (∅2) of software recovery, a processor undergoes bootstrap, i.e., fresh copies of the operating system and application programs are loaded into the main stores from backup, secondary, memory such as a disk. However, the local copy of the data from the equipment configuration data base (ECD) and the protected application segments (PASs) of programs are saved. As the name implies, the ECD is a data base defining the configuration of the system 100, such as what equipment and options the system 100 is equipped with, how that equipment is configured, and what the communication and signaling procedures are among the equipment. Since the ECD information is not reloaded, the reinitialization is hastened by not having to restore peripheral equipment to a known state consistent with the information in the secondary-storage copy of the ECD. The PAS is a segment of memory assigned to a process in which a process typically saves information crucial to its recovery.

Phase three (∅3) of software recovery is like ∅2, but only the PAS is preserved, while the ECD is reloaded from backup memory.

Phase four (∅4) of software recovery is like ∅3, but everything is cleared from a processor's main store and reloaded from backup store. Even the PASs are destroyed. This level of recovery can only be initiated by a manual command.

The level of hardware initialization that is to be executed by a MRF sequence on an active processor is indicated by a pair of Initialization Sequence Control (ISC) bits 211 and 212, shown in FIG. 4. In the 3B20 computer, the ISC bits 211 and 212 are implemented within a processor's system status register (SSR). The ISC bits 211 and 212 may be thought of as a hardware initialization level counter for microcode. Upon being called on an active processor, MRF examines the ISC bits 211 and 212 to determine the level of recovery that it should undertake. As will become clear from FIG. 5, every level of hardware recovery eventually involves some level of software recovery.

MRF executing on an inactive processor ignores the value of the ISC bits 211 and 212. In an inactive processor, the level of initialization performed by MRF is basic initialization, such as is conventionally done on powering up of a processor.

The entry of a hardware initialization sequence marks the beginning of an initialization interval during which the affected processor is considered unstable. Should another request for hardware initialization occur during this interval, the ISC bits 211 and 212, their binary value having been decremented at the start of the initialization interval, escalate the level of initialization, i.e., indicate that the next level of initialization should be performed. In response, the next-level hardware initialization sequence is entered, the value of the ISC bits 211 and 212 is again decremented, and the timing of the initialization interval is restarted. During this interval, yet another initialization request will again signal the next level of initialization. The value of the ISC bits 211 and 212 cannot be decremented further and hence subsequent processor-generated recovery requests during an unexpired initialization interval result in the highest automatic level of recovery being reattempted. After each request for initialization, if the initialization interval times out without receipt of another initialization request, the ISC bits 211 and 212 are reset to an idle binary value.

MRF also takes as its inputs the configuration, or state, of the system 100 at the time MRF was called and the reason why MRF was called, i.e., the conditions that resulted in MRF being called or the source of the call to MRF.

MRF is diagramed in logical flow form in FIGS. 5a–b. For clarity of discussion, it will be assumed that in FIGS. 5a–b MRF was called on the processor0 101, with the understanding that the actions taken by MRF would be equivalent if MRF were called on the processor1 102. Upon being called on the processor0 101, at the block 400, MRF responds by first storing in the processor's micro store the hardware state of that processor0 101, as indicated by block 401.

A processor's hardware state is indicated by the contents of certain of that processor's special registers. The special registers are registers that indicate the status, including errors, of the processor. They include registers such as: the program status word (PSW) that stores software-related information associated with the currently-executing program, the system status register (SSR) that stores system-related information associated with such things as system configurations, maintenance and recovery control and status; the hardware status register (HSR) that stores hardware status and control information; and the error register (ER) that stores system error status. The contents of the special registers are saved so that subsequently-called diagnostics and recovery programs can, if need be, examine this information and determine therefrom how to restore the affected processor and the system 100.

Having saved the hardware state of the processor0 101, MRF goes on to determine the reason why it was called. First, as indicated in block 402, MRF checks whether it was called in response to the processor0 101 being powered up. If so, MRF initializes the processor0 101, as indicated in block 403. The level of initialization performed is the basic, drastic initialization to place all aspects of the processor0 101 in a known state. Inter alia, the initialization results in clearing of the processor's special registers and sanity timers and the disabling of input and output activities.

Having initialized the processor0 101 at block 403, MRF clears, i.e., zeros, the contents of the MAS 114, as indicated in block 404. The purpose of this action is to generate good parity at each main store word. At this point the update function of the MASUs 115 and 125 is turned off, and hence clearing of the MAS 114 has no effect on the contents of the MAS 124.

Having cleared the MAS 114, MRF again initializes the processor0 101, as indicated in block 405, to clear up any errors that may have resulted from clearing the MAS, and to again reset the processor's sanity timers.

Next, MRF gives an indication that power-up initialization is completed, as shown in block 406. This indication involves setting an indicator 213, shown in FIG. 4. In the 3B20 computer, the indicator 213 is word 3 of the MAS 114. MRF then concludes its activities by halting the processor0 101, as indicated in block 407 of FIG. 5a.

If the other processor1 102 is already active, the indication that power-up initialization has been completed, for example the indicator 213, is periodically monitored by the other processor1 102. When the processor1 102 detects that the processor0 101 has been powered up and initialized, it responds by marking the processor0 101 as out-of-service by setting an indicator 218 in the ECD. Inter alia, this marking serves to indicate to the active processor1 102 that it must henceforth reset the sanity timers of the inactive but now powered-up and hence available, processor0 101 to keep the sanity timers from generating a fault indication. The processor1 102 then continues with its activities.

If the other processor1 102 is not active, it does not respond to the indication of completed power-up initialization that is raised by the processor0 101. Hence a sanity timer of the processor0 101 times out and generates a fault indication, to which the inactive processor0 101 responds by attempting a stop and switch (see FIG. 7). The stop and switch involves stopping the processor0 101 and calling MRF on the other processor1 102. A processor is stopped and started in a conventional manner, for example by setting and resetting a flag such as a flip-flop, provided for that purpose. If the processor1 102 is powered-up, calling MRF will generally eventually result in either the processor0 101 or the processor1 102 becoming active. This will become clear from the discussion of blocks 450–465 of FIG. 5b.

If, however the other processor1 102 is not powered-up, it does not respond to the stop and switch. And since the processor1 102 does not reset the sanity timer of the processor0 101, the sanity timer times out at a second threshold, referred to as the backup sanity timer. This results in a fault indication in the processor0 101 that leads to MRF being called on the processor0 101. If the processor0 101 is functional, this leads to the processor0 101 becoming active. This will again become clear from the discussion of blocks 450–465 of FIG. 5b.

If MRF was not called in response to the processor0 101 being powered up, at the block 402 of FIG. 5a, MRF checks whether it was called by the processor1 102 over the backup maintenance channel (BMTCH) 104b (see FIG. 1), as indicated by block 420. If so, it is an indication that the processor1 102 wished to access the processor0 101 over the maintenance channel 104a, for example for the purpose of resetting the sanity timer of the processor0 101, but was not able to do so because of failure of the MTCH 104a. MRF responds by initializing the processor0 101, as indicated in block 421. The processor0 101 is initialized at the basic initialization level discussed above, to clear any errors that the faulty MTCH 104a may have produced and to reset the sanity timer of the processor0 101. Following the initialization, MRF again stops the processor0 101, as indicated in block 422.

If MRF was not called either upon power up, at the block 402, or over the backup MTCH 104b, at the block 420, MRF checks whether the processor0 101 is currently forced off-line (FOFL, see FIG. 2), as shown in block 430. Indication thereof is given by an indicator 214, shown in FIG. 4, that is implemented as a flag bit in the system status register (SSR). If the processor0 101 is forced off-line, MRF responds by initializing the processor0 101, as indicated in block 431, at the basic initialization level. MRF then again halts the processor0 101, as indicated in block 432.

If the processor0 101 is not forced off-line, MRF readies the processor0 101 to become active. MRF again initializes the processor0 101, as indicated in block 435, at the basic initialization level. MRF then enables the processor0 101 to engage in input and output activities, as indicated in block 436. This is accomplished by setting a flag bit 216, shown in FIG. 4, in the SSR. MRF also causes the hardware state of the processor0 101 that was saved at the block 401 to be transferred from microstore into the MAS 114, as suggested in block 437.

Turning to FIG. 5b, MRF next checks whether it was called in response to a manual command, as suggested in block 440. Indication thereof is given by an indicator 217 of FIG. 4. In the 3B20 computer, the indicator 217 is implemented in the emergency action interface (EAI) parameter buffer. If called manually, MRF checks the command to determine whether a bootstrap was requested thereby, as suggested in block 441. If a bootstrap was requested, MRF performs a bootstrap on the processor0 101 at the requested level, i.e., phase two, three, or four of reinitialization, as suggested in block 442. If this recovery attempt does not lead to an escalation of recovery attempts, at the completion of the bootstrap the processor0 101 is caused to return to a point determined by the reinitialization.

If the manual command did not request a bootstrap, at the block 441, MRF checks whether the requests was to load disk from tape, as indicated in block 445. The disk is commonly the secondary memory of the system 100 and the tape is commonly the tertiary memory of the system 100. Both are subsumed in the peripheral equipment units (PEU) 131–132 and 141–142 of FIG. 1. If the request was to load disk from tape, MRF undertakes to satisfy the request, as indicated in block 446. MRF then awaits the next manual command, as indicated in block 446. The expected command is a request for bootstrap.

If neither bootstrap nor loading of disk from tape were requested by the manual command, MRF performs a phase one level of initialization on the processor0 101, as indicated in block 448. If this recovery attempt does not lead to an escalation of recovery attempts, at the completion of the phase one of reinitialization the processor0 101 is caused to return to and resume its interrupted activities, at a point determined by the reinitialization.

If MRF determines, at the block 440, that it was not called by a manual command, it examines the value of the ISC bits 211 and 212 of the SSR to determine what level of initialization it should undertake. A binary value of "11" is the idle value of the ISC bits 211 and 212 of the processors 101 and 102 arranged in an active-inactive configuration. If MRF finds the ISC bits 211 and 212 to have a binary value of "11", at the block 450, MRF decrements their value to "10", as shown in block 451, and performs a phase one level of initialization on its own processor0 101, as shown in block 452. Once more, if this recovery attempt does not lead to an escalation of recovery attempts, at the completion of the phase one level of reinitialization the processor0 101 is caused to return to and resume its interrupted activities, at a point determined by the reinitialization.

The first decremented binary value "10" is the idle value of the ISC bits 211 and 212 of the processors 101 and 102 arranged in an active-active configuration. If MRF finds the ISC bits 211 and 212 to have a binary value of "10", at the block 460, MRF decrements their value to "00", as shown in block 461, and performs a hard change also known as a stop and switch. The type of hard change that MRF performs is a function of which one of the states 1–6 of FIG. 2 the system 100 was in when the call to MRF was made. The processes involved in the various hard changes are discussed in conjunction with FIGS. 13 and 14.

If MRF determines, at the blocks 450 and 460 of FIG. 5b that the value of the ISC bits 211 and 212 of the processor0 101 is other than "11" or "10", MRF responds thereto by performing some level of bootstrap, i.e., a phase two or three level of reinitialization. This is indicated in block 461. The level of bootstrap to be performed is decided upon by software called by MRF and depends upon the type of recovery that is desired. This may, for example, depend upon the last level of attempted but unsuccessful bootstrap and represent an escalation of bootstrap level. Again, if this recovery attempt does not lead to a further escalation or repetition of recovery attempts, at the completion of the bootstrap the processor 101 is caused to return to a point determined by the reinitialization.

Once at bootstrap, further calls to MRF during the initialization period do not result in a change of the value of the ISC bits 211 and 212 and merely cause MRF to attempt a higher level of bootstrap reinitialization. Phase four level of reinitialization will not be escalated up to by MRF automatically. It will be undertaken in response to a manual command only, at the block 442.

Attention is now turned to the procedure of the system recovery process which takes place in an active processor. This procedure is logically diagramed in FIG. 6. For purposes of clarity of discussion of FIG. 6, it is assumed that the fault detection and response thereto is occurring on the processor0 101.

As shown in FIG. 6 and mentioned above, detection of a fault in the hardware of the active processor0 101 of the system 100 results in the generation of a hardware interrupt in the affected processor0 101.

If the hardware interrupt indicates occurrence of a fatal fault, i.e., one of such magnitude that the affected processor0 101 is unable to continue operation and must be taken out of service, the mechanism responding to the interrupt automatically generates a stop and switch signal.

Response of the processor0 101 to the stop and switch signal is diagramed in logical flow form in FIG. 7. Generation of the stop and switch signal, at the block 500, is responded to by the maintenance channel 104a, and results in a MRF call being made on the other processor1 102, as indicated in block 501. The stop and switch signal also stops the faulted processor0 101, as indicated in block 502.

Returning to consideration of FIG. 6, when the maintenance channel 104a issues a MRF call to the other processor1 102, MRF is called on the processor1 102 only if the processor1 102 is inactive. The response of the inactive processor1 102 to a MRF call is shown in FIGS. 5a–b. However, if the processor1 102 is active, the MRF call results in notification of the fault recovery software of the processor1 102 of the MRF call request. The fault recovery software of the processor1 102 responds as a function of the previous state of the processor0 101. If the processor0 101 was active when it caused MRF to be called on the processor1 102, the fault recovery software of the processor1 102 responds by performing a hard converge to the processor1 102. The process of hard convergence is discussed in conjunction with FIG. 13. But if the processor0 101 was inactive, the fault recovery software of the processor1 102 considers the processor0 101 to be faulty and therefore removes the processor0 101 from service. The process of processor removal is discussed in conjunction with FIG. 9.

If a hardware interrupt does not indicate a fatal fault, it is converted in the affected processor0 101 into a software interrupt of the appropriate level, depending upon the type of error it is. Likewise, if a fault is detected in the software of the processor0 101, it results in the generation of a software interrupt of the appropriate level in the affected processor0 101.

The software interrupt is responded to by the microcode of the affected processor0 101. The microcode examines the impact of the fault on the software of the processor0 101. If all interrupts are masked, indicating that a fault-recovery function of the processor0 101 is currently executing and hence was the one that caused the error, a call to MRF is made on the faulted processor0 101. MRF responds to the fault as a function of the value of the ISC bits of the processor0 101, as indicated in FIGS. 5a–b.

If all interrupts to the microcode are not masked, the interrupt results in the generation of an error interrupt to the fault recovery software of the affected processor0 101.

In response, the fault recovery program of the affected processor0 101 updates, i.e., increments, appropriate error counters (not shown) and examines their status. If updating of a counter results in its exceeding a specified threshold count, the fault recovery mechanism attempts a soft change in the configuration of the system 100. The type of soft change undertaken is a function of the current configuration of the system 100. If the system 100 is in an active-active configuration, the attempted soft change is a soft converge to the other processor 102. The process of soft convergence is discussed in conjunction with FIG. 11. If the system 100 is in an active-standby configuration, the soft change is a soft switch to the other processor 102. The process of soft switching is discussed in conjunction with FIG. 12.

If the attempted soft change fails, the fault recovery software of the affected processor0 101 attempts a hard change to the other processor1 102. The type of hard change undertaken is a function of the current configuration of the system 100. If the system is in an active-active configuration, the attempted hard change is a hard converge to the other processor1 102. The process of hard convergence is discussed in conjunction with FIG. 13. If the system 100 is in an active-standby configuration, the hard change is a hard switch to the other processor1 102. The process of hard switching is discussed in conjunction with FIG. 14.

If the soft change is successful, the fault recovery program, which is now executing on the remaining active processor1 102, informs the operating system kernel of the soft change.

After informing the kernel of the soft change, or if updating of a counter did not result in its exceeding a specified threshold count, the fault recovery program examines the information that has been gathered about the fault to determine whether the software of the system 100 has been affected by the fault. If software is not affected, the processor on which the kernel is executing resumes execution of system tasks. If software is affected, the fault recovery program also makes available to the kernel the information that has been gathered about the fault.

As the above discussion indicates, the kernel that is provided information about the fault is executing either on the faulted processor0 101 or on the other processor1 102, depending on whether or not a change of processors was successfully made. The kernel examines the information received from the fault recovery program to determine whether the kernel itself is affected by the fault, or whether only other, non-kernel, programs are affected thereby. If the kernel determines that it is affected by the fault, it requests fault recovery to call MRF on the processor on which the kernel is executing. The source of the call is considered by MRF to be system software, i.e., not a manual request to MRF, and hence MRF responds according to the dictates of the ISC bits 211 and 212 of the processor on which it is called.

If the kernel determines that it was not directly affected by the fault, the kernel determines what other programs may have been affected by the fault. If an affected program has no fault entry point, it is terminated by the kernel. If an affected program has a fault entry point, the program is directed by the kernel to execute from its fault entry point.

Entered at the fault entry point, the program proceeds to clean itself up, i.e., to recover from the effects of the fault. This cleanup may result in the program terminating itself. If the program determines that it has control over some system resource and that that resource can be recovered only through system initialization, it requests the system fault recovery program to call MRF on the processor on which the program is executing. The source of the call to MRF is still considered by MRF to be the system software, i.e., not a manual request to MRF, and MRF responds according to the dictates of the ISC bits 211 and 212 of the processor on which it is called.

The above-described configuration changes, automatically undergone as part of system fault recovery, are not the only configuration changes that the system 100 may undergo. For example, the system 100 may undergo other automatic changes, such as from an active-out of service configuration to an active-standby configuration, in response to diagnostics determining that the out of service processor is in condition to become active. A change from active-standby to active-active state, or vice versa, may be undergone in response to a program request. And the system 100 may undergo whatever change is desired in response to commands manually entered by an operator of the system 100. The activities that are included in the various state changes of FIG. 2 are described next.

As was mentioned previously, the system 100 comes up on power-up in active/out-of-service state 5 or 6. The system 100 undergoes transition from active/out-of-service state 5 or 6 to active-standby state 3 or 4 in one of two ways. First, the active processor may periodically run audits and other diagnostic processes on the out-of-service processor to determine the condition of that processor. If the out-of-service processor passes diagnostics, indicating that it is in condition to become standby, a restore command is automatically given to the active processor. And second, the active processor may receive a manual command to restore the out-of-service processor. The restoral involves transition of the out-of-service processor to the standby state. The process of restoral is logically diagramed in FIG. 8.

As shown in FIG. 8, upon receipt of a restore directive, indicated in block 600, the active processor, for example the processor0 101, checks the appropriate indicators 218 and 220 (see FIG. 4) of the processors' ECD 200 to make sure that the system configuration is indeed active/out-of-service, as indicated in block 601. If not, the active processor0 101 causes an error message to be issued, as suggested in block 602. If the system configuration is active/out-of-service, the active processor0 101 then sets an indicator 209, shown in FIG. 4 and implemented as a flag bit in the SSR, to cause the main store update circuits 115 and 125 to resume updating the main stores 114 and 124, as suggested in block 603.

Following restoral of update capability, the active processor0 101 takes advantage of this capability to cause the contents of its main store 114 to be copied into the main store 124 of the other processor1 102, as suggested in block 604. Thus the contents of the main stores 114 and 124 are made identical. The active processor0 101 then preconditions the standby processor1 102, as indicated in block 605. Preconditioning involves running of tests, such as parity tests, on the standby processor1 102 to make sure that the standby processor1 102 is in condition to become active. If the standby processor1 102 fails the preconditioning tests, at the block 606, the active processor0 101 aborts the restoral, as indicated in block 607. Aborting restoral involves, for example, again causing the main store update units 115 and 125 to cease updating the main stores 114 and 124, and issuing an error message to operators of the system 100. If the standby processor1 102 passes the preconditioning tests at the block 606, the active processor0 101 enters the ECD and marks the other, i.e., the out-of-service, processor1 102 as being in standby state, as shown in block 608, by changing the values of the appropriate indicators 218 and 219. The restoral to the standby state of the processor1 102 is completed and the active processor0 101 continues its activities, as indicated in block 609.

The converse of the restoral process is the removal process, which involves transition of the system 100 from state 3 or 4 to state 5 or 6, respectively. The removal process removes a standby processor to the out-of-service state. This process is logically diagramed in FIG. 9.

As shown in FIG. 9, upon receipt of the remove command or request, at the block 700, the active processor, for example the processor0 101, checks information stored by indicators 219 and 220 of the ECD to make sure that the system configuration is indeed active-standby, as shown in block 701. If the system configuration is not active standby, the active processor0 101 causes an error message to be output, as indicated in block 702. If the system configuration is active-standby, the active processor0 101 once again enters the ECD and stores therein information designating the other, i.e., the standby, processor1 102 as being out of service, as indicated in block 703. The active processor0 101 then resets the indicator 209 of the SSR to cause the main store update circuits 115 and 125 to cease updating their respective main stores 114 and 124 with information being entered in the other main store, as suggested in block 704. The active processor0 101 then continues with its activities, as indicated in block 705. The removal process is completely transparent to executing programs, because no programs were executing on the removed processor.

The transition from an active-standby state 3 or 4 of the converged mode 10 to an active-active state 1 or 2, respectively, of the diverged mode 11 is logically diagramed in FIG. 10.

Upon receiving the diverge command, in block 800, the active processor, for example the processor0 101, accesses the ECD to verify that the system 100 is in an active-standby configuration, as shown in block 801. If the system 100 is not in active-standby configuration, the active processor0 101 causes an error message to be issued, as indicted in block 802. If the system 100 is found at block 801 to be properly configured, the active processor0 101 creates necessary operating system structures for the other processor1 102, as indicated in block 803, to prepare the other processor1 102 to run its own version of the operating system. As shown in FIG. 3b, this includes creation of a copy of the segment table and data and creation of a second interrupt stack and dispatch queue 311.

Returning to FIG. 10, the active processor0 101 then creates shadows of fault recovery programs, as indicated in block 804. Shadows are partial copies of the fault recovery programs that undertake activities which must be undertaken in the system 100 on a per-processor basis. Activities that need be performed on a system-wide basis, such as the maintenance of sanity timers, are performed by the fault recovery programs of the primary, i.e., the currently-active, processor0 101 and are excluded from the shadows, which will execute on the secondary processor1 102.

Following creation of the shadows, the active processor0 101 places the other processor1 102 in a known, initialized state, as suggested in block 805. The active processor0 101 also changes the idle state of ISC bits 211 and 212 from "11" to "10", as indicated in block 806, to reflect the anticipated active-active processor configuration. The active processor0 101 then utilizes the maintenance channel 104 to run a test routine on the other processor1 102, as indicated in block 807, to verify that the other processor1 102 is in condition to become active. If the other processor1 102 fails the test, at the block 808, the active processor0 101 aborts the diverge process, as indicated in block 809. Aborting of divergence involves, for example, eliminating the interrupt stack and dispatch queue 311 and other structures that were created for the other processor1 102, terminating the shadows of the fault recovery programs, resetting the idle state of the ISC bits 211 and 212 back to "11", and issuing an error message to system 100 operators.

If the other processor1 102 passes the test at the block 808, the active processor0 101 moves the shadows to the dispatch queue of the other processor1 102, as indicated in block 810. By using the OPPIR line 105a, the active processor0 101 causes an interrupt to occur in the other processor1 102, which results in the shadows being dispatched, i.e., executed, on the other processor1 102, as suggested in block 811. If the shadows report finding faults in the other processor1 102, at the block 812, the active processor0 101 again causes divergence to be aborted, as indicated in block 813. If the shadows report finding no faults in the other processor1 102 at block 812, the active processor0 101 diverges the two processors' dispatch queues, as indicated in block 814. Divergence of the dispatch queues involves transferring some tasks from the dispatch queue of the active processor0 101 to the dispatch queue of the other processor1 102. Each task may have information associated with it that indicates on which processor, i.e., primary or secondary processor, it prefers to execute, and the active processor0 101 may diverge the dispatch queues on the basis of this information.

Following divergence of the dispatch queues, the active processor0 101 again utilizes the OPPIR line 105a to start the other processor1 102 running, as suggested in block 815. The originally-active processor0 101 remains the primary processor, and the previously-standby processor1 102 becomes the secondary processor. The diverge process is thus completed, and the primary processor0 101 resumes its normal processing activities, as indicated in block 816.

From the states 1 and 2 of the diverged mode 11, the system 100 may be brought back into an active-standby state 3 or 4 via a soft converge process. The system 100 may soft converge to either the primary or to the secondary processor. The two soft converge processes are substantially identical, and both are logically diagramed in FIG. 11.

Upon receipt of a soft-converge directive, at the block 900, the processor that receives the directive, for example the processor0 101, places a converge program on the dispatch queue of whichever one of the processors 101 and 102 will become inactive, as indicated in block 901. This vacating processor may be either one of the processors 101 and 102, and hence the processor0 101 may place the converge program on its own or on the other processor's dispatch queue. For example, if the processor0 101 is converging to itself, it places the converge program on the dispatch queue of the other processor1 102. The processor0 101 then continues with its processing activities, as suggested in block 902.

The converge program is the lowest-priority task in the system 100. Consequently, it gets dispatched and runs on the vacating processor, at block 903, only when no other programs on the vacating processor are interrupted, i.e., stopped in the midst of execution and waiting to continue execution. Thus, when the converge program begins to execute, there are no lower-priority programs which have been interrupted by higher-priority programs and hence the interrupt stack of the vacating processor is guaranteed to be empty. The interrupt stack is conventional: a storage area operated on a last-in first-out basis for storing information necessary for resumption of execution of interrupted programs.

Upon beginning to execute at the block 903, the converge program causes the vacating processor to access the ECD and verify that the system is in an active-active configuration, as shown in block 904. If the system configuration is not active-active, the converge program causes an error indication to be issued, as indicated in block 905. At this point the converge program terminates, and the system 100 continues with other program-executing activities.

If the system configuration is found to be active-active in the block 904, the converge program dispatches a kernel converge program on the processor that it is executing on, i.e., the vacating processor, as indicated block 906. The converge program also raises the execution priority level of the kernel converge program to the highest existing level, also as indicated in the block 906. This assures that once the kernel converge program begins to execute, it will not be interrupted and preempted by other tasks.

When the kernel converge program executes on the vacating processor, it sends an interrupt to the other processor, over the OPPIR 105, as suggested in block 907. The kernel converge program then stops the vacating processor, as indicated in block 908.

Responding to the interrupt that it receives from the vacating processor at the block 910, the other, remaining active, processor first changes the idle state of the processors' ISC bits 211 and 212 from "10" to "11", as indicated in block 911, to reflect the active-inactive processor configuration. The remaining active processor then converges the dispatch queues of the two processors by moving all tasks from the dispatch queue of the secondary processor to the dispatch queue of the primary processor, as indicated in block 912. The shadows of the fault recovery programs are no longer needed, and the remaining active processor terminates the shadows, as indicated in block 913.

At this point the soft converge to primary and soft converge to secondary processes differ, as indicated in block 914. If the requested convergence was to the secondary processor, the remaining active processor is the secondary processor, and it accesses the indicator 210 to switch the identities of the processors 101 and 102, as suggested in block 915. The stopped processor that was before designated as primary is now designated as secondary and the formerly-secondary, remaining active processor now becomes the primary processor.

Following the change of processor identities, or if the requested convergence was to the primary processor, the remaining active processor enters the ECD and accesses the indicators 219 and 220 to store therein information indicating that the system 100 is now in an active-standby state 3 or 4, as suggested in block 916. The remaining active processor then continues with system 100 operations, as suggested in block 917.

In the active-standby configuration of state 3 or 4, the processors 101 and 102 may be caused to switch states. The soft switch transfers system activities from one processor to the other in a manner transparent to any executing process or to any input and output operations that are in progress. The soft switch is logically diagramed in FIG. 12.

Upon receipt of the soft switch request, at the block 1000, the active processor, for example the processor0 101, accesses the ECD to determine if the system 100 configuration is active-standby, as shown in block 1001. If not, the active processor0 101 issues an error message to the operators of the system 100, as indicated in block 1002. If the system 100 configuration is active-standby, the active processor0 101 stops execution of normal tasks, to freeze the state of the active processor0 101, as indicated in block 1003. The processor0 101 then accesses its own status registers to determine its internal processor state, as shown in block 1004. Once the internal processor state of the formerly-active processor0 101 is determined, the processor0 101 utilizes the maintenance channel 104 to set the other processor1 102 to that internal processor state, as indicated in block 1005. This includes setting the indicators 200 of the processor1 102 to the state held by the corresponding indicator 200 of the processor0 101, and hence the processor1 102 becomes the primary processor. The processor0 101 then sends a command over the MTCH 104a which tells the other processor1 102 to start, as suggested in block 1006. The other processor1 102 takes over normal system processing activity from the point at which the formerly-active processor0 101 ceased those activities, and the processor0 101 stops, as suggested in block 1007, and assumes the standby state.

When the system 100 is in a state 1 or 2 of the diverged mode 11, it may undergo a hard convergence to a state 5 or 6. As is the case with soft convergence, the system 100 may hard converge to either the primary or the secondary processor. Which processor the system 100 converges to depends on which processor is given the hard converge directive. Hard converge to primary and hard converge to secondary are analogous processes, and both are logically diagramed in FIG. 13.

Upon receipt of the hard converge directive at the block 1100, the recipient, remaining-active, processor, for example the processor0 101, resets the indicator 209 of its SSR to cause its MASU 115 to cease updating of the other processor's main memory 124, as suggested in block 1101. The processor0 101 also changes the idle state of the processors' ISC bits 211 and 212 from "10" to "11", as indicated in block 1102, to reflect the anticipated active/out-of-service processor configuration. Next, the processor0 101 enters the ECD, marks therein the other, stopped, processor1 102 out of service, as indicated in block 1103.

Next, the active processor0 101 converges the dispatch queues of the primary and secondary processors by moving all tasks from the secondary processor's dispatch queue to the primary processor's dispatch queue, as indicated in block 1105. The primary processor may be either one of the processors 101 and 102, and hence the processor0 101 may converge the dispatch queues to its own or to the processor's 102 dispatch queue. The active processor0 101 then takes steps, such as setting appropriate indicators, to cause all processes to become reinitialized prior to executing, as indicated in block 1106. The shadows of the fault recovery programs will not be needed following convergence, and hence the active processor0 101 terminates the shadows, as indicated in block 1107.

At this point the hard converge to primary and hard converge to secondary processes differ, as suggested in block 1108. If the active processor0 101 is the secondary processor, the process being undertaken is hard converge to secondary, and the active processor0 101 accesses the indicator 209 to switch the processor identities and make itself the primary processor, as suggested in block 1109.

Following the switch in processor identities, or if the active processor0 101 is the primary processor and hence the hard converge process is to primary, the active processor0 101 enters the ECD to store therein information indicating the new active/out-of-service state of the system, as suggested in block 1110. The processor0 101 then continues with normal system processing activities, as indicated in block 1111.

The system 100 may undergo a hard switch from the active-standby configuration of state 3 or 4 to the out-of-service/active configuration of the state 6 or 5. The system 100 may also switch states between the active/out-of-service state 5 and the out-of-service/active state 6, forcing the formerly out-of-service processor to become active, i.e., to go online, and forcing the formerly active processor to go out of service, i.e., to go offline. Both the hard switch and the force-online/force-offline processes involve like steps. Both processes are logically diagramed in FIG. 14.

Upon receipt of the hard switch or force-online/force-offline directive at the block 1200, the formerly-inactive processor, for example the processor0 101, is activated and initializes itself, as indicated in block 1201. The level of initialization is the basic level such as was discussed previously in conjunction with FIG. 5. At this point the other formerly-active processor1 102 is inactive, having been stopped by the stop and switch signal that lead to the performance of the hard switch or FONL/FOFL process (see FIG. 6). The activated processor0 101 also takes steps, such as setting proper indicators, to cause all processes to initialize before executing, as indicated in block 1202. As suggested in block 1203, the processor0 101 then starts up activities as the active processor of the system 100. The active processor0 101 enters the ECD to store therein information indicating the current system configuration and marking the now-inactive processor1 102 as out of service, as suggested by block 1204. The active processor0 101 then continues with execution of normal system tasks, as indicated in block 1205.

Of course, various changes and modifications to the illustrative embodiment described above will be apparent to those skilled in the art. For example, the invention may be implemented on a suitable processing system other than the 3B20D/UNIX RTR computer. Such changes and modifications can be made without departing from the spirit and the scope of the invention and without diminishing its attendant advantages. It is therefore intended that such changes and modifications be covered by the following claims.

What is claimed is:

1. A processing system comprising:
    a first and a second processor;
    a first main memory included in the first processor and a second main memory included in the second processor, the first and second main memories having the same contents;
    means interconnecting the first and the second memories, when active for automatically updating each main memory with content changes being made in the other main memory to cause the first and second main memories to continue having the same contents; and
    means for automatically changing system operation from a first to a second mode of operation transparently to execution of application tasks in response to certain conditions, wherein in the first mode both processors are active and each is executing substantially independently of the other tasks selected from a different one of a first and a second group of tasks, and wherein in the second mode of operation a selected either one of the processors is inactive and the other of the processors is active and executing tasks selected from both the first and second groups of tasks, the operation-changing means including means for fully occupying processor state of the one processor with at least one task that need not be continued on the other processor, at time of inactivation of the one processor, to ensure that any processor state existent in the one processor during the first mode of operation prior to the inactivation and relating to an application task not completed by the one processor is stored by the one processor in the one processor's main memory and by operation of the memory updating means is copied form the one processor's main memory to the other processor's main memory to be available to the other processor for execution of the related application task during the second mode of operation without recalculation by the other processor of the processor state relating to the application task.

2. The system of claim 1 wherein the certain conditions comprise manual and program commands and system fault conditions.

3. The system of claim 1 wherein
    the means for occupying processor state comprise
    an uniterruptible task for stopping the one processor to end the first mode of operation, and for assigning the first and second groups of tasks for execution to the active other processor to begin the second mode of operation,
    a task having lowest-priority in the one processor, when executed for effecting execution of the uninterruptible task, the execution of the lowest-priority task ensuring absence of interrupted tasks from the one processor and thereby ensuring presence in the main memory of any processor state of the one processor relating to an application task not completed by the one processor, and
    means responsive to the certain conditions for scheduling for execution the lowest-priority task to initiate the changing of system operation from the first mode to the second mode.

4. The system of claim 3 further comprising a first dispatch queue stored in the main memories and associated with the other processor for identifying tasks of the first group during the first mode of operation and for identifying tasks of the first and the second group during the second mode of operation, and further comprising a second dispatch queue stored in the main memories and associated with the one processor for identifying tasks of the second group during the first mode of operation; and wherein
    the uninterruptible task is for stopping the one processor and causing the other processor to converge the first and second dispatch queues to the first dispatch queue to begin the second mode of operation.

5. The system of claim 1 further comprising:
    first and second peripheral means;
    first controller means interposed between the first peripheral means and the first and the second processors for selectively connecting the first peripheral means with one of the first and the second processors to give either processor, when active, access to the first peripheral means for purposes of execution of tasks on that processor; and
    second controller means interposed between the second peripheral means and the first and the second processors for selectively connecting the second peripheral means with one of the first and the second processors to give either processor, when active, access to the second peripheral means for purposes of execution of tasks on that processor.

6. A processing system comprising:
    a first and a second processor;
    a first main memory included in the first processor and a second main memory included in the second processor, the first and second main memories duplicating each other's contents;
    means interconnecting the first and the second main memories, when active for automatically updating each main memory with content changes being made in the other main memory to cause the first and second main memories to continue having the same contents; and
    means for automatically changing system operation from a first to a second mode of operation transparently to execution of application tasks in response to certain conditions, wherein in the second mode both processors are active and each is executing substantially independently of the other tasks selected from a different one of a first and a second group of tasks, and wherein in the first mode one of the processors is inactive and the other of the processors is active and executing tasks selected from both the first and the second group of tasks, the operation-changing means including means for causing the active other processor during the first mode of operation to change contents of the memory of the active other processor, thereby to effect like changes of contents of the memory of the one processor by way of the memory updating means copying the changed contents of the memory of the active other processor into the memory of the one processor, in order to prepare the one processor for becoming activated and to assign one of the groups of tasks to the one processor for execution during the second mode of operation, and further for causing the active other processor to activate the one processor in order to begin the second mode of operation.

7. The system of claim 6 wherein the certain conditions comprise manual and program commands and system fault conditions.

8. The system of claim 6 wherein
the means for causing comprise
a task executed by the active other processor in response to the certain conditions to initiate change of system operation from the first to the second mode and including (a) task means for initializing an operating system of the one processor in the memory of the active other processor to cause like initialization to occur in the memory of the one processor by way of operation of the memory updating means, (b) task means for causing the one processor to execute maintenance tasks to ensure that the one processor may be entrusted with execution of application tasks in the second mode of operation, (c) task means for assigning one of the first and second groups of tasks for execution to the one processor in the memory of the active other processor to cause like assignment to occur in the memory of the one processor by way of operation of the memory updating means, and (d) task means for starting the one processor to begin the second mode of operation wherein the one processor executes tasks from the assigned one of the first and second groups of tasks.

9. The system of claim 8 further comprising
a first dispatch queue stored in the main memories and associated with the active other processor for identifying tasks of the first group during the second mode of operation and for identifying tasks of the first and the second group during the first mode of operation; and the system further selectively comprising
a second dispatch queue stored in the main memories and associated with the one processor for identifying tasks of the second group during the second mode of operation; wherein
the task means for initializing comprise
means for initializing the second dispatch queue; and wherein
the task means for assigning comprise means for diverging the second group of tasks to the second dispatch queue from the first dispatch queue.

10. The system of claim 6 further comprising:
first and second peripheral means;
first controller means interposed between the first peripheral means and the first and the second processors for selectively connecting the first peripheral means with one of the first and the second processors to give either processor, when active, access to the first peripheral means for purposes of execution of tasks on that processor; and
second controller means interposed between the second peripheral means and the first and the second processors for selectively connecting the second peripheral means with one of the first and the second processors to give either processor, when active, access to the second peripheral means for purposes of execution of tasks on that processor.

11. A processing system comprising;
as first and a second processor;
a first main memory included in the first processor and a second main memory included in the second processor, the first and second main memories duplicating each other's contents; and
means interconnecting the first and the second main memories, when active for automatically updating each main memory with content changes being made in the other main memory to cause the first and second main memories to continue having the same contents; and
means cooperative with the memory updating means for automatically changing processor operation from any one to another of a first, a second, and a third mode of operation in response to certain conditions, the changes from one to another of the first and the second modes being transparent to execution of application tasks, wherein in the first mode both processors are active and each is executing substantially independently of the other programs selected from a different one of a first and a second group of tasks, wherein in the second mode one of the processors is active and executing tasks of both groups and the other of the processors is standing by ready to assume execution of tasks and wherein in the third mode one of the processors is active and executing tasks of both groups and the other of the processors is unavailable to assume execution of tasks.

12. The system of claim 11 wherein the certain conditions comprise manual and program commands and a soft and a hard type of system fault conditions.

13. The system of claim 11 wherein the means for automatically changing system operation comprise:
means for selectively starting and stopping a selected processor to effect change of operation from one to another of the modes;
means for selectively identifying a stopped processor as being out of service during the third mode of operation; and
means cooperative with the starting and stopping means and with the memory updating means for assigning both the first and second groups of task for execution to the active processor when one processor is stopped during the second and the third modes of operation, and for assigning the first group of tasks to the primary processor and the second group of tasks to the secondary processor when both processors are active during the first mode of operation, the assigning means performing the assignment in the memory of one processor thereby to effect like assignment in the memory of the other processor by way of operation of the memory updating means.

14. The system of claim 13 further comprising a first dispatch queue stored in the main memories and associated with the primary processor for identifying tasks of the first group during the first mode of operation, and for identifying tasks of the first and the second group during the second and third modes of operation; and the system further selectively comprising a second dispatch queue stored in the main memories and associated with the secondary processor for identifying tasks of the second group during the first mode of operation; and wherein the assigning means comprise means for converging the first and second dispatch queues to the first dispatch queue when one processor is stopped during exit from the first mode of operation, and means for diverging the first an second queues from the first dispatch queue when both processors become active during entry into the first mode of operation.

15. The system of claim 11 further comprising:

first and second peripheral means;

first controller means interposed between the first peripheral means and the first and the second processors for selectively connecting the first peripheral means with one of the first and the second processors to give either processor, when active, access to the first peripheral means for purposes of execution of task on that processor; and second controller means interposed between the second peripheral means and the first and the second processors for selectively connecting the second peripheral means with one of the first and the second processors to give either processor, when active, access to the second peripheral means for purposes of execution of tasks on that processor.

16. In a processing system that includes a first and a second processor, a first main memory included in the first processor and a second main memory included in the second processor, the first and second main memories having the same contents including programs that include fault recovery programs and a first dispatch queue for holding identities of programs designated for execution, and apparatus interconnecting the first and second memories for automatically updating each main memory with content changes being made in the other main memory, a method of automatically changing system operation transparently to execution of application programs from a first state wherein the second processor is inactive and the first processor is active and executing programs selected from those indentified by the first dispatch queue to a second state wherein there are in each main memory the first and a second dispatch queue each for holding identities of programs designated for execution by a different one of the first and second processor, and wherein both processors are active an executing substantially independently of each other' programs identified by their respective dispatch queues, the method comprising the step of:

creating the second dispatch queue for identifying programs designated for execution by the second processor during the second mode of operation, in the main memory of the first processor thereby to effect like creation in the main memory of the second dispatch queue from the main memory of the first processor to the main memory of the second processor;

creating shadow fault recovery programs comprising selected portions of the fault recovery programs for performing on the second processor fault recovery activities performable on a per-processor basis;

setting the second processor to a known state to initialize the second processor;

placing the identity of the shadow fault recovery programs in the second dispatch queue in the main memory of the first processor thereby to effect like placing in the main memory of the second processor by operation of the memory updating means;

executing the shadow fault recovery programs on the second processor to ensure that the second processor may be entrusted with execution of application tasks in the second mode of operation;

transferring the identity of programs, designated for execution by the second processor during the second mode of operation from the first to the second dispatch queue in the main memory of the first processor thereby to effect like transfer in the main memory of the second processor by operation of the memory updating means;

starting the second processor to execute programs identified by the second dispatch queue to commence the second mode of operation; and continuing execution by the first processor of programs identified by the first dispatch queue.

17. In a processing system that includes a first and a second processor, an indicator arrangement for designating selectively either one of the processors as a primary processor and designating the other processor as a secondary processor, a first main memory included in the first processor and a second main memory included in the second processor, the first and second main memories having the same contents including programs that include the first and second main memories having the same contents including programs that include a first an a second program, fault recovery programs, and shadow fault recover programs comprising selected portions of the fault recover programs, and a first and a second dispatch queue for holding the identities of programs designated for execution by the primary and secondary processor, respectively, and apparatus interconnecting the first and second main memories for automatically updating each main memory with content changes being made in the other main memory, a method of automatically changing system operation transparently to execution of application programs from a first state wherein both processors are active and executing substantially independently of each other programs identified by their respective dispatch queues to a second state wherein the second processor is standing by ready to assume execution of programs and the first processor is active and executing programs selected from programs identified by the first dispatch queue, the method comprising the steps of:

placing the identity of the first program in the dispatch queue of the second processor to initiate a change of system operation from the first to the second mode;

commencing to execute the first program only when no interrupted programs are identified by the dispatch queue of the second processor to ensure that any processor state existent in the second processor during the first mode of operation and relating to an application task not completed by the second processor is stored by the second processor in the second processor's main memory and by operation of the memory updating means is copied from the second processor's main memory to the first processor's main memory to be available to the first processor for execution of the related application task during the second mode of operation;

causing the second program to be executed on the second processor, in response to execution of the first program, the second program being executed without interruption to ensure that a processor state relating to an application task is not formed by the second processor during system transition between the first and second modes of operation;

interrupting the first processor in response to execution of the second program to cause the first processor to complete the system transition from the first to the second mode of operation;

stopping the second processor;

moving identity of programs from the second dispatch queue to the first dispatch queue to designate for execution by the primary processor during the second mode of operation programs designated for execution by the secondary processor during the first mode of operation, in response to the interruption;

removing the identity of shadow fault recovery programs from the first dispatch queue to avoid during subsequent program execution duplication of activities of the fault recovery programs;

checking the indicator arrangement to determine whether the first processor is designated the primary processor;

changing the indicator arrangement to switch the processors designations if the first processor is not designated the primary processor, to cause the first processor to select for execution programs from the first dispatch queue during the second mode of operation; and continuing to execute on the first processor programs identified by the first dispatch queue, in the second mode of operation.

18. In a processing system that includes a first and a second processor, an indicator arrangement for designating selectively either one of the processors as a primary processor and designating the other processor as a secondary processor, a first main memory included in the first processor and a second main memory included in the second processor, the first and second main memories having the same contents including programs that include fault recovery programs and shadow fault recovery programs comprising selected portions of the fault recovery programs, and a first and a second dispatch queue for holding the identities of programs designated for execution by the primary and secondary processor, respectively, and apparatus interconnecting the first and second main memories when active for automatically updating each main memory with content changes being made in the other main memory, a method of automatically changing system operation from a first state wherein both processors are active and executing substantially independently of each other programs identified by their respective dispatch queues to a second state wherein the second processor is out of service and the first processor is active and executing programs selected from programs identified by the first dispatch queue, the method comprising the steps of:

stopping the second processor to terminate the first mode of operation;

deactivating the main memory updating apparatus to cease updating of the main memory of the second processor with changes to the contents of the main memory of the first processor;

moving the identities of programs from the second to the first dispatch queue to designate for execution by the primary processor during the second mode of operation programs designated for execution by the secondary processor during the first mode of operation;

initializing the processes identified by the first dispatch queue to effect recovery of the processes from any events that lead to termination of the first mode of operation;

removing identities of the shadow fault recovery programs from the first dispatch queue to avoid during subsequent program execution duplication of activities of the fault recovery programs;

checking the indicator arrangement to determine whether the first processor is designated the primary processor;

changing the indicator arrangement to switch the processors' designations if the first processor is not designated the primary processor to cause the first processor to select for execution programs from the first dispatch queue during the second mode of operation; and continuing to execute on the first processor programs identified by the first dispatch queue, in the second mode of operation.

19. The system of claim 11 wherein the operation-changing means comprise:

means for automatically changing processor operation from one to another of six states of operation in response to certain conditions, wherein in the first and second states both processors are active and each is executing substantially independently of the other programs selected from a different one of a first and a second group of tasks such that in the first state the first processor is designated the primary processor, for executing tasks of the first group, and the second processor is designated the secondary processor, for executing tasks of the second group, and such that in the second state the second processor is designated the primary processor, for executing tasks of the first group, and the first processor is designated the secondary processor, for executing tasks of the second group, wherein in the third and fourth states one of the processors is active and executing tasks of both groups and the other of the processors is standing by ready to assume execution of tasks such that in the third state the first processor is active and such that in the fourth state the second processor is active, the changes from one to another of the first, second, third, and fourth states being transparent to execution of application tasks, and wherein in the fifth and sixth states one of the processors is active and executing tasks of both groups and the other of the processors is unavailable to assume execution of tasks such that in the fifth state the first processor is active and such that in the sixth state the second processor is active.

* * * * *

UNITED STATES PATENT AND TRADEMARK OFFICE
CERTIFICATE OF CORRECTION

PATENT NO. : 4,823,256                                      Page 1 of 2

DATED : April 18, 1989

INVENTOR(S) : Thomas P. Bishop, et al

It is certified that error appears in the above-identified patent and that said Letters Patent is hereby corrected as shown below:

Column 23, line 62, "form" should read --from--.

Column 26, line 21, "as first" should read --a first--.

Column 26, line 45, "and" should read --, and--.

Column 27, line 64, "active an" should read --active and--.

Column 27, line 66, "step" should read --steps--.

Column 28, line 4, "dispatch queue from the main memory of the" should read --processor by way of the memory updating--.

Column 28, line 5, "first processor to the main memory of the" should read --means copying the second dispatch queue from the main memory of the first--.

Column 28, line 6, "second processor;" should read --processor to the main memory of the second processor;--.

UNITED STATES PATENT AND TRADEMARK OFFICE
CERTIFICATE OF CORRECTION

PATENT NO. : 4,823,256

DATED : April 18, 1989

INVENTOR(S) : Thomas P. Bishop, et al

It is certified that error appears in the above-identified patent and that said Letters Patent is hereby corrected as shown below:

Column 28, line 44, delete "the first and second main memories having the".

Column 28, line 45, delete "same contents including programs that include".

Column 28, line 47, "recover" should read --recovery--.

Column 28, line 48, "recover" should read --recovery--.

Signed and Sealed this

Eighth Day of December, 1992

Attest:

DOUGLAS B. COMER

Attesting Officer

Acting Commissioner of Patents and Trademarks